United States Patent
Shiran et al.

(10) Patent No.: US 12,339,844 B2
(45) Date of Patent: *Jun. 24, 2025

(54) SELF-SERVICE DATA PLATFORM

(71) Applicant: Dremio Corporation, Santa Clara, CA (US)

(72) Inventors: Tomer Shiran, Santa Clara, CA (US); Jacques Nadeau, Santa Clara, CA (US)

(73) Assignee: Dremio Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,282

(22) Filed: Jun. 6, 2023

(65) Prior Publication Data

US 2023/0315730 A1 Oct. 5, 2023

Related U.S. Application Data

(63) Continuation of application No. 15/631,903, filed on Jun. 23, 2017, now Pat. No. 11,709,833.

(60) Provisional application No. 62/354,268, filed on Jun. 24, 2016.

(51) Int. Cl.
*G06F 16/2452* (2019.01)
*G06F 16/2453* (2019.01)

(52) U.S. Cl.
CPC .. *G06F 16/24542* (2019.01); *G06F 16/24524* (2019.01)

(58) Field of Classification Search
None
See application file for complete search history.

(56) References Cited

U.S. PATENT DOCUMENTS

| | | |
|---|---|---|
| 8,918,388 B1 | 12/2014 | Chen |
| 2003/0084025 A1 | 5/2003 | Zuzarte |
| 2006/0026154 A1 | 2/2006 | Altinel et al. |
| 2009/0070313 A1 | 3/2009 | Beyer et al. |
| 2009/0271369 A1 | 10/2009 | Cheng et al. |
| 2012/0072413 A1 | 3/2012 | Castellanos et al. |
| 2012/0130986 A1 | 5/2012 | Abdellatif et al. |
| 2013/0159286 A1 | 6/2013 | Manzano et al. |

(Continued)

OTHER PUBLICATIONS

Viktor Leis; How good are query optimizers, really?; Proceedings of the VLDB Endowment; vol. 9, Issue 3; 2015; pp. 204-215.*

(Continued)

*Primary Examiner* — Ann J Lo
*Assistant Examiner* — Jermaine A Mincey
(74) *Attorney, Agent, or Firm* — Thomas | Horstemeyer, LLP

(57) ABSTRACT

Disclosed embodiments include a method performed by server computer(s). The method includes receiving a query and defining a query plan based on the received query. The query plan refers to datasets contained in data sources. The method further includes determining that the received query can be accelerated based on an optimized data structure contained in a memory, where the optimized data structure is derived from a dataset referred to in the query plan. The method further includes modifying the query plan to include the optimized data structure, and executing the modified query plan to obtain query results that satisfy the received query by reading the optimized data structure in lieu of reading at least some data from the data sources.

20 Claims, 11 Drawing Sheets

(56) References Cited

U.S. PATENT DOCUMENTS

| | | |
|---|---|---|
| 2014/0019488 A1 | 1/2014 | Wo et al. |
| 2014/0047001 A1 | 2/2014 | Phillips et al. |
| 2015/0154257 A1* | 6/2015 | Xiong ............... H04L 43/20 |
| | | 707/718 |
| 2017/0147628 A1 | 5/2017 | Park et al. |

OTHER PUBLICATIONS

Gorawski, Marcin, StreamAPAS: Query Language and Data Model; 2009; IEEE; pp. 1-8 (Year:2009).
USPTO, Non-Final Office Action dated May 6, 2019 for U.S. Appl. No. 15/631,903, 14 pages.
USPTO, Final Office Action dated Nov. 20, 2019 for U.S. Appl. No. 15/631,903, 17 pages.
USPTO, Non-Final Office Action dated May 21, 2020 for U.S. Appl. No. 15/631,903, 19 pages.
USPTO, Final Office Action dated Jun. 30, 2022 for U.S. Appl. No. 15/631,903, 72 pages.
USPTO, Non-Final Office Action dated Sep. 29, 2021 for U.S. Appl. No. 15/631,903, 66 pages.
USPTO, Non-Final Office Action dated Nov. 10, 2022 for U.S. Appl. No. 15/631,903, 73 pages.
USPTO, Notice of Allowance for U.S. Appl. No. 15/631,903 dated Mar. 9, 2023, 14 pages.

\* cited by examiner

SELF-SERVICE DATA PLATFORM

CROSS-REFERENCE TO RELATED APPLICATION

This application is a continuation of U.S. patent application Ser. No. 15/631,903, filed Jun. 23, 2017 and now pending, which claims priority to U.S. provisional patent application Ser. No. 62/354,268, filed Jun. 24, 2016, which application is incorporated herein in its entirety by this reference thereto.

TECHNICAL FIELD

The disclosed teachings relate to a data platform and, more particularly, the disclosed teachings relate to a self-service data platform that enables users to discover, curate, accelerate, and analyze data from one or more data sources.

BACKGROUND

Conventional data analytics systems can collect, analyze, and act upon data contained in data sources. The data sources can be computing devices that are internal, external, local, or remote relative to the data analytics system. For example, an external remote data source can be a server connected over a computer network to the data analytics system. Existing data analytics systems have many drawbacks. They are designed for use exclusively by information technology (IT) professionals and not end-users. The systems are burdened by using extract, transform, and load (ETL) pipelines to pull data from the data sources and store the pulled data to a centralized data warehouse or data lake. These systems are inadequate because they offer only partial and stale data for querying and analysis.

Analysts typically spend significant amounts of time collecting and preparing data rather than actually analyzing the data with business intelligence (BI) tools. Examples of BI tools that have analytics or visualization capabilities include TABLEAU, POWER BI, R, or PYTHON. These tools operate primarily on data that resides in a single, small relational database. However, modern organizations use non-relational data sources such as HADOOP, cloud storage (e.g., S3, MICROSOFT AZURE BLOB STORAGE) and NOSQL databases (e.g., MONGODB, ELASTICSEARCH, CASSANDRA).

In addition, data is often distributed across disparate data sources such that a user cannot simply connect a BI tool to any combination of data sources. A connection mechanism is often too slow, queries often fail, volumes of raw data are too large or complex, and data are often of mixed types. Further, users seeking flexible access to data analytics systems oftentimes circumvent security measures by downloading or extracting data into unsecure, ungoverned systems such as spreadsheets, standalone databases, and BI servers for subsequent analysis. Accordingly, users seek capabilities to access, explore, and analyze large volumes of mixed data from distributed data sources without being burdened by rigid data analytics systems available mainly to IT professionals.

SUMMARY

The disclosed embodiments include a method performed by server computer(s). The method includes receiving a query and defining a query plan based on the received query. The query plan refers to datasets contained in data sources. The method further includes determining that the received query can be accelerated based on an optimized data structure contained in a memory, where the optimized data structure is derived from a dataset referred to in the query plan. The method further includes modifying the query plan to include the optimized data structure, and executing the modified query plan to obtain query results that satisfy the received query by reading the optimized data structure in lieu of reading at least some data from the data sources.

In some embodiments, the method further includes, prior to receiving the query, generating the optimized data structure to include raw data of at least one of the datasets, generating the optimized data structure to include an aggregation of data column(s) of at least one of the datasets, generating the optimized data structure to include at least one of sorted, partitioned, or distributed data of data column(s) of at least one of the datasets, and/or generating the optimized data structure to include data sampled from at least one of the datasets.

In some embodiments, the received query is a second query and the query results are second query results. The method further includes, prior to receiving the second query, generating the optimized data structure based on first query results that satisfy a first query. In some embodiments, the query plan is a second query plan, and a first query plan is defined to have a scope broader than necessary for obtaining query results satisfying the first query such that the generated optimized data structure is broader than an optimized data structure generated based on a query plan having a scope that is minimally sufficient for obtaining query results satisfying the first query.

In some embodiments, the query results are obtained without reading any of the datasets contained in the data sources or by reading at least some of the datasets contained in the data sources in addition to reading the optimized data structure.

In some embodiments, the method further includes autonomously deciding to generate the optimized data structure prior to determining that the received query can be accelerated. In some embodiments, the decision to generate the optimized data structure is based on a history of queries received by the server computer(s) and/or based on a determination that reading the optimized data structure in lieu of reading the at least some data from the data sources improves processing of an expected workload.

In some embodiments, the method further includes, prior to receiving the query, receiving user input requesting acceleration of queries on dataset(s) of the datasets and generating the optimized data structure in response to the received request.

In some embodiments, the method further includes, prior to receiving the query, receiving user input defining a virtual dataset derived from a physical dataset contained in the data sources, where the datasets include the virtual dataset.

In some embodiments, the modified query plan is only executed by a distributed query engine of the computer server(s).

The disclosed embodiments include a computer system. The computer system includes a processor and memory containing instructions that, when executed by the processor, cause the computer system to connect to data sources that contain physical datasets, cause display of a visual dataset editor, and allow users to curate data by using the visual dataset editor to create virtual datasets derived from the physical datasets without creating any physical copies of the curated data._

In some embodiments, the virtual datasets are exposed as tables in client applications. In some embodiments, the computer system is further caused to allow the users to share the virtual datasets via the visual dataset editor.

In some embodiments, the visual dataset editor includes a control that upon being selected by a user causes the computer system to open a client application connected to a virtual dataset.

In some embodiments, the computer system is further caused to display a visualization indicative of relationships between physical datasets and virtual datasets.

In some embodiments, the computer system is further caused to autonomously decide to generate an optimized data structure based on a physical dataset contained in the data sources, and store the optimized data structure in the memory, where the optimized data structure accelerates execution of a query referring to the physical dataset or a virtual dataset derived from the physical dataset.

Other aspects of the technique will be apparent from the accompanying Figures and Detailed Description.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

DETAILED DESCRIPTION

The embodiments set forth below represent the necessary information to enable those skilled in the art to practice the embodiments, and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, may refer to any connection or coupling, either direct or indirect, between two or more elements. The coupling or connection between the elements can be physical, logical, or a combination thereof.

Self-Service Data Platform

Figures 1A, 1B, 1C:
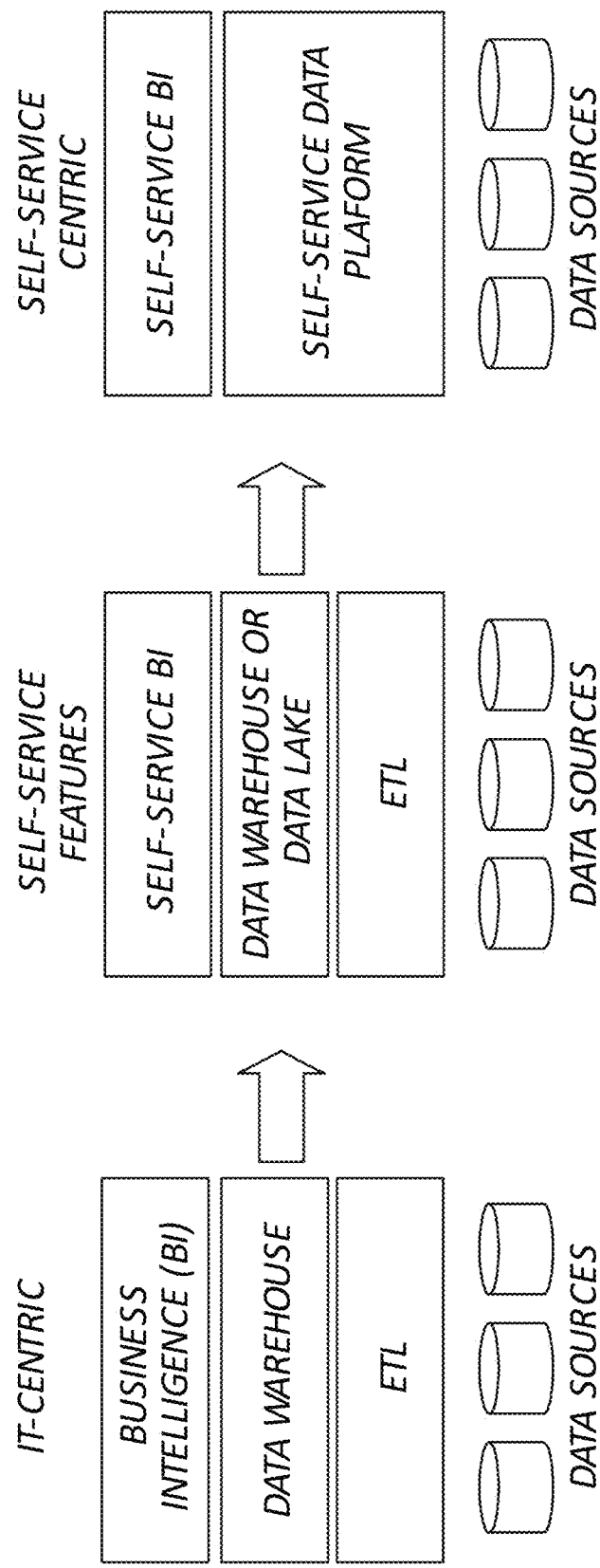
FIGS. 1A through 1C are block diagrams illustrating the evolution from IT-centric to self-service data analytics systems according to some embodiments of the present disclosure.

FIGS. 1A through 1B are block diagrams illustrating the evolution of data analytics systems from IT-centric to self-service systems according to some embodiments of the present disclosure. In FIG. 1A, an IT-centric architecture includes an extract, transform, and load (ETL) tool operable to pull data from data source(s) and store the pulled data in a data warehouse. A business intelligence (BI) tool can be used to query the data warehouse. In FIG. 1B, an intermediate architecture is modified from the IT-centric architecture of FIG. 1A to include a data warehouse or alternative storage such as HADOOP or cloud storage. The intermediate architecture includes an ETL tool but offers a self-service BI tool for end-users rather than a BI tool exclusively for IT professionals. Lastly, FIG. 1C shows a self-service architecture modified from the intermediate architecture of FIG. 1B by replacing the ETL tool and data warehouse or alternative storage with a self-service data platform.

Disclosed herein are embodiments of the self-service data platform ("the platform"), which has self-service analytics capabilities for use in diverse environments. The platform enables entities (e.g., organizations, users, analysts, data scientists) to discover, curate, explore, and analyze diverse data from diverse data sources at any time and avoids the need to spend excessive time collecting or preparing data. For example, FIG. 2 is a block diagram illustrating features of the platform for performing data analytics according to some embodiments of the present disclosure.

Figure 2:
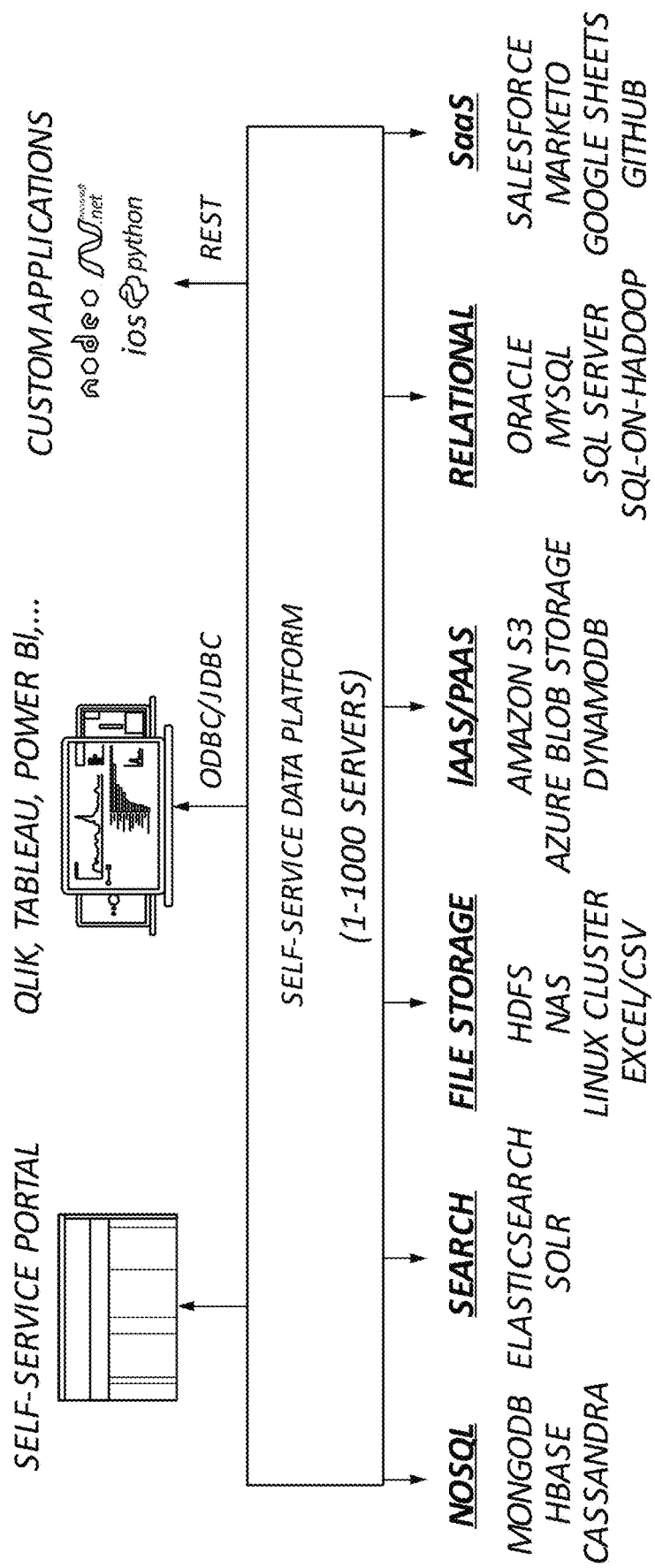
FIG. 2 is a block diagram illustrating features of a self-service data platform for performing data analytics according to some embodiments of the present disclosure.

As shown in FIG. 2, the platform is coupled between numerous data sources and analysis or visualization tools. In this example, the platform operates on or is coupled to 1-1,000 servers connecting the analysis and visualization tools to the numerous data sources. Examples of the data sources include NOSQL sources (e.g., MONGODB, HBASE, CASSANDRA), search sources (e.g., ELASTICSEARCH, SOLR), file storage sources (e.g., HDFS, NAS, LINUX CLUSTER, EXCEL/CSV), cloud computing (e.g., IaaS, PaaS, SaaS) sources (e.g., AMAZON S3), relational sources (e.g., MySQL, SQL server), and SaaS source (e.g., SALESFORCE, MARKETO, GOOGLE SHEETS, and GITHUB). Examples of analysis or visualization tools include an analyst center (e.g., self-service portal), BI tools (e.g., QLIK SENSE, TABLEAU, POWER BI) via ODBC/JDBC, data science tools (e.g., R, PYTHON) and custom applications via REST. As such, users of the analysis or visualization tools can readily query and analyze data from the numerous data sources.

Figure 3:
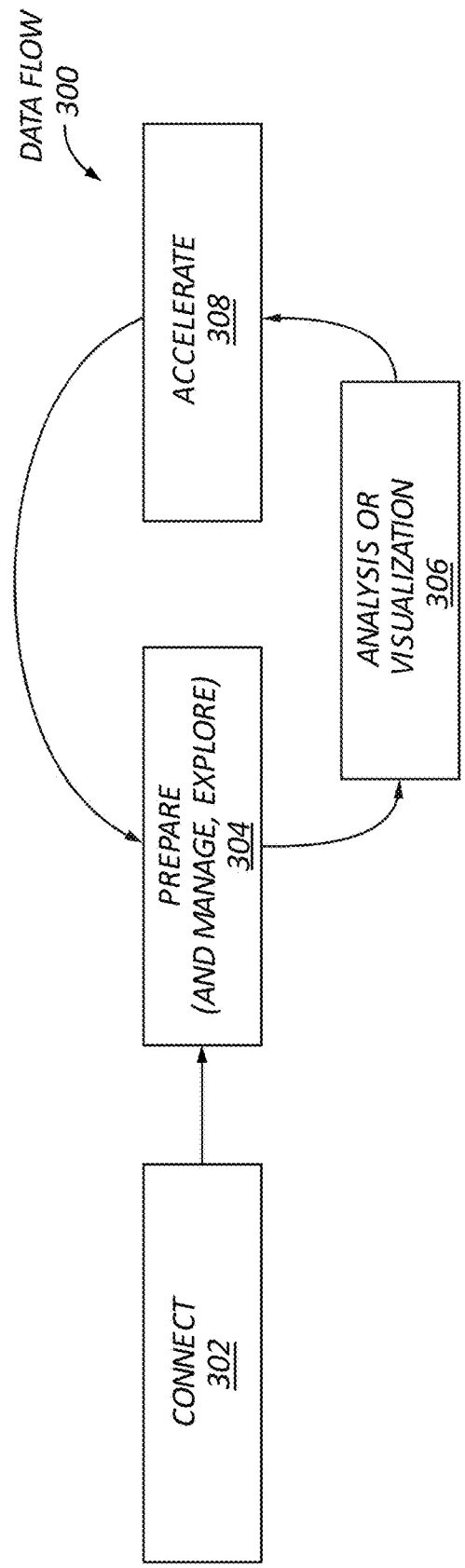
FIG. 3 is a block diagram illustrating a high-level data-flow for a self-service data platform according to some embodiments of the present disclosure.

FIG. 3 is a block diagram illustrating a high-level dataflow 300 for the platform according to some embodiments of the present disclosure. The dataflow commences with a connection process 302 connecting the platform to data source(s) from which data can be obtained. The obtained data undergoes a preparation (i.e., curation) process 304. In some instances, the obtained data can undergo manage or explore processes that allows a user to manage, explore, and/or share the prepared data. In addition, the platform can create optimized data structures based on the obtained data. A description of optimized data structures is provided further below. The user can use manage and explore processes 304 to edit the optimized data structures in an effort to improve subsequent query executions. The prepared data can then undergo an analysis or visualization process 306 in response to a query execution. For example, a BI tool can be used to visualize queried data. In some instances, a subsequent query execution can undergo an acceleration process 308 to rapidly obtain query results based on the optimized data structures. The dataflow can cycle between the prepare process 304, analyze or visualize process 306, and acceleration process 308 as needed to optimize the outcome of data analytics performed by the platform.

The self-service features of the platform can improve user experience. Examples of self-service features involve data management and preparation, integration with diverse data sources, handling dynamic schemas, dataset namespace and path structures, exposing dataset information, data intelligence, user-defined data security, an autonomous memory for accelerating query executions, and a BI tool launcher. The self-service features of the platform are described in greater detail below.

The platform can process a variety of data types from a variety of data sources. For example, the platform can connect to non-relational data sources, relational databases, data warehouses, and spreadsheets to gather data in response to a query. For example, the platform can connect to data sources that traditionally could not be queried including NOSQL databases (e.g., MONGODB, ELASTICSEARCH, HBASE), cloud storage (e.g., AMAZON S3, AZURE BLOB STORAGE, GOOGLE CLOUD STORAGE), and HADOOP (e.g., HDFS, MAPR-FS). The platform can connect to a combination of these data sources, and simultaneously or asynchronously query data from across these data sources.

The platform may have flexible data connection capabilities. It does not require defining a schema, data model, or to ETL data for querying a data source. A schema, as used herein, may refer to a structure that represents a logical view of an entire data store. It defines how data is organized and how the relations among the data are associated. A data model, as used herein, may refer to fundamental entities to introduce abstraction in a database management system. Data models can define how data is connected to each other and how they are processed and stored inside a system. ETL, as used herein, refers to a process for pulling data out of source systems and placing it into a data warehouse or any other system.

In some embodiments, the platform supports a full range of structured query language (SQL) commands. SQL is a domain-specific language often used to interact with a database management system. In this context, SQL commands can be used to specify the desired query. Examples of SQL commands include complex joins, correlated subqueries, and window functions.

In some embodiments, the platform is aware of data sources and their native capabilities such that it can employ native query processes. For example, the platform can push-down a free-text search to ELASTICSEARCH because it knows that this particular data source supports free-text searches. The platform may enable tools such as TABLEAU, EXCEL, and R to query data in the data sources.

The platform may have broad data preparation capabilities. For example, the platform can perform real-time data preparation using live data or virtual data. The platform can also include a virtual dataset editor that enables an end-user to prepare virtual datasets. Unlike existing systems, the prepared data of the platform lives in virtual datasets such that physical copies of the datasets are not required. The disclosed platform can also perform analysis-informed preparation. For example, the platform can switch back-and-forth between TABLEAU and preparation processes. Further, the platform can recommend actions based on user behavior. For example, machine learning can be used to learn from users that use the platform.

The platform may offer enterprise-grade security and governance capabilities with consumer-grade ease-of-use. This includes versatile and intuitive access control mechanisms. For example, a user can decide who can access what data at granular levels such as data row or data column levels. The user can even hide some data from users or groups. The platform may also maintain lineage capabilities. That is, datasets are connected and a user can browse ancestors and descendants of each dataset and column. The platform may also have auditing capabilities that allow a user to monitor who is accessing data and identify a time when the data was accessed. In some embodiments, the platform can generate real-time reports showing, for example, the top 10 users of a given dataset or accessing datasets off-hours.

The platform may offer improved performance and scalability. The platform can allow users to interact with data of diverse types and of any size, and from diverse data sources. The platform may accelerate query executions by using optimized data structures, also referred to herein as reflections, which can reside in memory or on persistent storage. As a result, the platform can provide orders of magnitude query acceleration and production system isolation compared to existing systems. The platform can also perform columnar in-memory analytics including columnar execution, byte-code rewriting, and runtime compilation. In some embodiments, such analytics are implemented in APACHE ARROW.

The platform may support numerous computing devices. For example, the platform may use a server cluster that can scale to thousands of servers and run on-premise and/or in the cloud. The platform may integrate any number of distributed data stores of data sources. The platform understands the distribution of data and has capabilities to query each data source. This maximizes push-downs (e.g., RDBMS, MONGODB, ELASTICSEARCH) and allows for reading data in parallel from distributed data stores.

Management and Preparation

The platform may be configured to connect to diverse data sources. For example, a user can input connection information for each data source. Examples of connection information include an IP address or domain name and credentials that enable access to data contained in the data source. The platform can then use the connection information to connect to the data source and run queries on any datasets of the data source. Any query may include multiple datasets and data sources (e.g., through joins).

The platform enables users to discover data, curate data, accelerate queries, and share data of the data sources with other users. The platform can include a unified data catalog for users to discover and explore physical or virtual datasets, data sources, and their relationships to each other. As used herein, a "physical dataset" may refer to raw data contained in data sources connected to the platform. The platform enables end-users to interact with the physical datasets contained in these data sources. A physical dataset may belong to a namespace hierarchy exposed by a data source. Examples include relational tables, MONGODB collections, files or directories of files, or ELASTICSEARCH indexes or types. For example, a MONGODB data source can have a simple hierarchy such as <cluster>.<database>.<collection>. An AMAZON S3 data source can have an arbitrarily complex hierarchy such as <bucket>.<path>.<to>.<directory>.

The platform enables users to curate data by creating virtual datasets. As used herein, a "virtual dataset" refers to a dataset defined by a user of the platform. A virtual dataset may be derived from physical dataset(s) or other virtual dataset(s). The platform does not need to save the actual data (e.g., content) of a virtual dataset. Instead, the platform only needs to save the definition of a virtual dataset (e.g., a "SELECT" statement in SQL analogous to a database view).

Accordingly, an end-user only needs to be concerned with datasets—physical and virtual. The platform may support a variety of point-and-click transformations, and users can utilize SQL syntax (or another supported language) to define more complex transformations. As queries are executed, the platform can learn about the data, enabling it to recommend various transformations such as joins and data type conversions. The data catalog can be automatically updated when data sources are newly added and as data sources or datasets change. All metadata may be indexed in a high-performance, searchable index, and exposed to users through the platform's portal interface. For example, users can browse a data graph to understand relationships between datasets and monitor what users are doing with a particular dataset. A user can explore and analyze data regardless of location and size, and needing minimal or no upfront work.

The platform can accelerate query execution by several magnitudes compared to directly querying datasets contained in data sources. For example, the platform can create optimized data structures (i.e., reflections) based on physical or virtual datasets. The optimized data structures can reside in memory or on persistent storage referred to as an autonomous memory or reflections data store. The optimized data structures can be used in lieu of directly querying data sources. An optimized data structure can be created autonomously by the platform, manually by a user of the platform, or a combination of both. That is, users can manually designate the datasets to accelerate and/or the system may decide which optimized data structures to create autonomously based on, for example, past queries and workloads for processing queries. In one example, users can vote for datasets that they think should be accessed faster, and the platform's cache heuristics can consider these votes in deciding which optimized data structures to create.

In some embodiments, an optimized data structure is anchored to at least one physical or virtual dataset. At query time, using the optimized data structure can accelerate querying meant for any underlying source datasets. In some embodiments, the optimized data structure is based on APACHE PARQUET OR ORC, with a variety of surrounding optimizations such as column-level statistics. The optimized data structure can be based on data (e.g., data columns) sorted, partitioned, and distributed by specific columns.

The optimized data structures are objects, materializations, data fragments, or the like, stored in the autonomous memory of the platform. The memory is referred to as "autonomous" because the platform can autonomously decide to generate optimized data structures that are stored in the autonomous memory for use to accelerate queries. When seeking to query a data source, the end-user does not need to consider any optimized data structures or know of their existence. Rather, the use of optimized data structures by the platform to accelerate a query is transparent to users. For example, when a query is received from a BI tool, an "optimizer" of the platform determines an optimal query execution plan ("query plan"), which may include pushing sub-queries down into the data sources and/or utilizing suitable optimized data structures.

An optimized data structure may contain data of any type or size. The platform knows the definition (i.e., logical plan) of the optimized data structure, which allows the platform to refresh the data of the optimized data structure and to determine, at query time, whether that optimized data structure can accelerate the computation of the query results. For example, when responding to a received query, the platform typically must perform a substantial amount of computational work. The query results that satisfy the query do not necessarily live in a data source or in an optimized data structure. Instead, for example, the raw data can live in the data sources as physical datasets. In a non-accelerated case, the computation starts with raw data and computes the query results. The optimizer of the platform can identify an opportunity to leverage an optimized data structure when there is a way to compute the query results based on the optimized data structure. In some embodiments, the optimizer may return an approximate query result within some user allowable tolerance when optimized data structures are available for such approximation rather than obtaining exact results.

The platform may decide whether to generate (i.e., create) optimized data structures autonomously, based on user input, or combinations thereof. For example, in order to facilitate management, the platform can have each optimized data structure anchored to a specific dataset (physical or virtual). This facilitates the ability of an administrator to understand what an optimized data structure contains and facilitates identifying queries on a dataset that are executing too slow such that a user can request creation of an optimized data structure anchored to that highly queried dataset.

The disclosed embodiments may include different types of optimized data structures. For example, an optimized data structure anchored to a single dataset could be a raw reflection or an aggregation reflection. A raw reflection has all the records in a dataset but perhaps only some of its data columns, sorted, partitioned and distributed by specific columns. An aggregation reflection has aggregation (i.e., summarization) of a dataset similar to an OLAP cube with dimensions and measures. An aggregation reflection can be used to accelerate aggregation queries. Another type of optimized data structure is a sample reflection that has samples of data from the dataset. A sample reflection can be used by the platform to accelerate queries by many orders of magnitude if a user allows for approximate query results (e.g., within 0.1% statistical error) based on sampled data.

The platform determines whether to leverage optimized data structures when defining or modifying a query plan based on a receive query. For example, the platform can compile a received SQL query from a client device to define a query plan. The query plan describes how the query will execute including all operations needed in order to compute the query results. When the platform determines that one or more optimized data structures can be used to accelerate a query, the platform may generate the query plan or modify a generated query plan to utilize the optimized data structure(s) rather than directly query data sources.

The platform may enable users to securely share data (e.g., virtual datasets or query results) with other users and groups. For example, a group of users can collaborate on a virtual dataset that will be used for a particular analytical job. Alternatively, users can upload their own data, such as EXCEL spreadsheets, to join to other datasets. In some embodiments, users that created virtual datasets can determine which other users can query or edit those virtual datasets.

Figure 4:
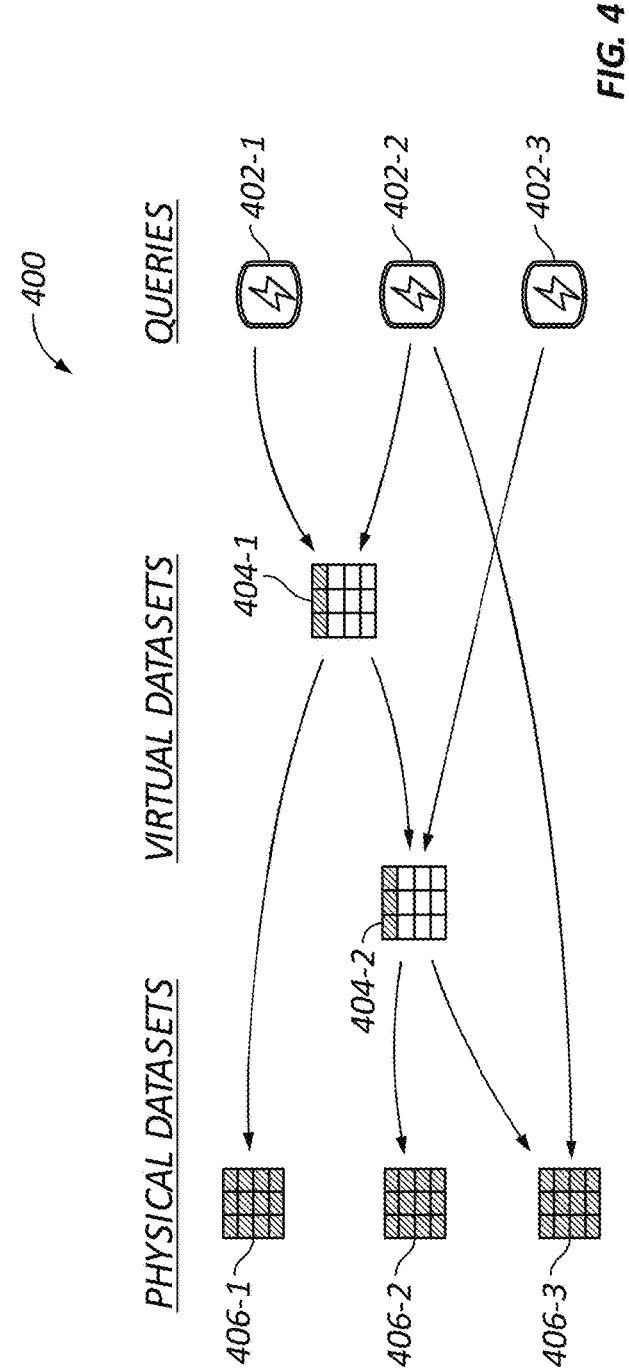
FIG. 4 is a diagram illustrating relationships between queries, virtual datasets, and physical datasets according to some embodiments of the present disclosure.

FIG. 4 is a block diagram illustrating relationships 400 between queries 402, virtual datasets 404, and physical datasets 406 according to some embodiments of the present disclosure. A physical dataset cannot have a parent dataset but can be the parent of a virtual dataset. A virtual dataset could also be the parent or child of another virtual dataset. The platform knows the relationships between any datasets, and can use that knowledge to determine what optimized data structures to create and maintain. Hence, the relationships can be used to accelerate a query execution process.

The arrows of FIG. 4 show how the queries 402 can be processed from a combination of virtual datasets 404 and/or physical datasets 406. The virtual dataset 404-1 is derived from a combination of the physical dataset 406-1 and the virtual dataset 404-2, and the virtual dataset 404-2 is derived from the physical datasets 406-2 and 406-3. As such, the query 402-1 can be satisfied from the virtual dataset 404-1. The query 402-2 can be satisfied from the virtual dataset 404-1 and the physical dataset 406-3. Lastly, the query 402-3 can be satisfied from the virtual dataset 404-2.

An application running on a client device may issue a query to the platform over ODBC, JDBC, REST or other APIs. The query may include one or more datasets residing in different data sources. For example, a query may be a join between a HIVE table, ELASTICSEARCH index, and several ORACLE tables. A query for a dataset will often be accelerated by using an optimized data structure anchored to a dataset. As indicated above, the optimized data structures may involve a raw reflection or an aggregation reflection. The raw reflection can include a projection of one or more columns of a dataset. The data may be sorted, partitioned, or distributed in different columns of a dataset. The aggregation reflection may include an aggregation of columns of a dataset. The aggregate dataset is defined by dimensions and measures, and contains aggregate-level data for each of the measures such as count, sum, min and max. The data may be sorted, partitioned, and distributed in different columns of a dataset.

As indicated above, although the platform can autonomously decide and automatically generate an optimized data structure, there may be circumstances in which a user desires to create a custom optimized data structure. In such instances, the platform allows the user to simply create a new optimized data structure with an SQL query that defines a desired materialization such as, for example, create a single raw reflection that includes all columns of a specific dataset.

The content of optimized data structures may be refreshed to update data or remove stale data. The content may be refreshed manually or automatically to ensure that the most current data is available for queries. The optimized data structures may be refreshed in accordance with full or incremental refresh processes.

The platform may maintain a directed acyclic graph (DAG) that defines an order in which optimized data structures should be refreshed. The dependencies can be calculated from relational algebra, and the actual refresh start time can take into account the expected amount of time required to complete a refresh cycle. This approach reduces the end-to-end cycle time, as well as the compute resources required to complete the cycle. In addition, by leveraging one optimized data structures to refresh another optimized data structures, the platform can avoid accessing operational databases more than once in a refresh cycle.

In some embodiments, a user can indicate a relative staleness of data that is permitted for use in optimized data structures. The indication can be a threshold value that limits relevant query results data. Accordingly, the platform can automatically determine when to refresh each optimized data structure in the autonomous memory based on the threshold. For example, a user can indicate via the UI that relevant query results can be at most 8 hours old.

The platform may take into account relationships to determine an optimal order in which optimized data structures should be refreshed. For example, an optimized data structure X could be refreshed prior to an optimized data structure Y if the optimized data structure Y is derived from the optimized data structure X. In addition, the platform may allow a user to restrict the total number, rate, and period for refreshing optimized data structures. For example, a refresh operation may be set to a specific time window (e.g., night time only). In some embodiments, a user can specify a schedule for refreshing optimized data structures. In some embodiments, the platform may continuously maintain the autonomous memory up-to-date based on any changes made to a data source. This can be done by consuming a database log, monitoring a directory for new files, or running queries on the data source that return the new and/or updated records.

The platform may use multiple techniques to reduce time and resources required to obtain query results. For example, the platform may consider the capabilities of a particular data source and a relative computational expense for querying the particular data source. In some embodiments, the platform can define a query plan that executes stages of the query execution at the data source or the platform's distributed execution environment to achieve the most efficient execution. In another example, the platform can accelerate a query execution by using available optimized data structures in the autonomous memory for portions of the query when this produces the most efficient overall query plan. In many cases, execution of a query plan can be orders of magnitude more efficient when only querying optimized data structures rather than querying any underlying data sources.

The platform may be able to push down processing into relational and non-relational data sources. Non-relational data sources typically do not support SQL and have limited execution capabilities. For example, a file system cannot apply predicates or aggregations. On the other hand, MONGODB, can apply predicates and aggregations but does not support all joins. The optimizer considers capabilities of each data source and, as such, the platform will push as much of a query to the underlying source as possible when it is most efficient and performs the rest in its own distributed execution engine.

The platform may offload and protect operational databases. Most operational databases are designed for write-optimized workloads. Furthermore, deployments must address stringent service level agreements (SLAs), and any downtime or degraded performance can significantly impact the business. As a result, operational systems are frequently isolated from processing analytical queries. In these cases, the platform can execute analytical queries by using optimized data structures, which provide the most efficient query processing possible while minimizing impact on the operational system.

Embodiments include a portal for a user to interact with the platform. The portal may be a network portal including a user interface (UI) that can facilitate data management and preparation operations by users. For example, a user can create a virtual dataset by using a visual dataset editor view of the portal. An example of a portal is a network portal such as a web browser displaying a graphical UI (GUI) including graphical controls for users to submit queries, access datasets, prepare virtual datasets, receive query results, and the like. For example, a GUI can include clickable links to physical datasets and buttons to initiate creation of a virtual dataset based on other datasets.

Accordingly, the portal may enable users to manipulate a dataset. In addition, the portal may display an interactive data graph similar to that shown in FIG. 4. For example, each node in the data graph can represent a dataset. A virtual dataset can have both incoming and outgoing edges, and a physical dataset would only have outgoing edges because any physical dataset is in a data source.

In some embodiments, a user can select a node from the data graph to edit the underlying dataset. For example, the user can change a column's data type, flatten a nested structure, rename a column, or extract a portion of a column into a new column. In addition, a user can select other datasets to combine with a current dataset. Each such transformation updates the definition for the transformed virtual dataset. In some embodiments, the definition of a virtual dataset can be expressed as a SQL "SELECT" statement, and the user can edit the definition directly. Once the user is satisfied with the resulting dataset, the user can save the virtual dataset by specifying a name and location in a hierarchical namespace for that dataset. From that point on, other virtual datasets can be derived from the named virtual dataset.

In some embodiments, a user can also upload files to the platform in addition to physical datasets residing in data sources such as databases and file systems. For example, a user can upload an EXCEL spreadsheet, which is then stored and exposed as a dataset of the platform. For example, assume that the platform is connected to a NOSQL database or HADOOP cluster with an extremely large dataset. The user may want to replace specific values in one column (e.g., to solve a data quality issue). The user could upload an EXCEL spreadsheet with two columns including old values and new values, respectively, and then create a virtual dataset as a join between the large dataset and the EXCEL spreadsheet.

Thus, management and preparation features of the platform are designed to enable self-service by a user to create and modify virtual datasets and/or cause creation of optimized data structures without needing specialized technical knowledge or skills and without needing to define schemas. In some embodiments, a user can simply interact with data in a spreadsheet-like interface. In addition, multiple users may collaborate by building on one another's virtual datasets.

Integration of Data Sources

The platform may harmonize query execution operations across diverse data sources including local and remote data sources. Further, the platform can access data distributed across multiple data sources including relational and non-relational data sources. For example, the platform can retrieve data from different data sources and combine the data to produce final query results that satisfy a query.

The platform may have a scale-out architecture. It can scale from one server to thousands of servers in a single cluster. The platform may be deployed on dedicated hardware or on shared infrastructure such as HADOOP clusters, private clouds or public clouds. For example, the platform can be deployed on a HADOOP cluster when using the platform to analyze data in HADOOP. This enables the platform to achieve data locality for raw data and the optimized data structures contained in the autonomous memory.

The platform cluster has two distinct roles: coordinators and executors. Each role can be scaled independently. Coordinators are nodes responsible for coordinating query execution, managing metadata and serving the portal. Client applications, such as BI tools, connect to and communicate with coordinators. Coordinators can be scaled up to process more clients concurrently. Executors are nodes responsible for query execution. Client applications do not connect to executors. Executors can be scaled up to process larger data volumes and more concurrent queries.

When running the platform on HADOOP, the coordinators could be deployed on edge nodes so that external applications such as BI tools can connect to them. Furthermore, there is no need to manually deploy the platform on the HADOOP cluster because the coordinators can use YARN to provision the compute capacity on the cluster. To maximize performance, every node in the cluster may have an executor.

Figure 5A:
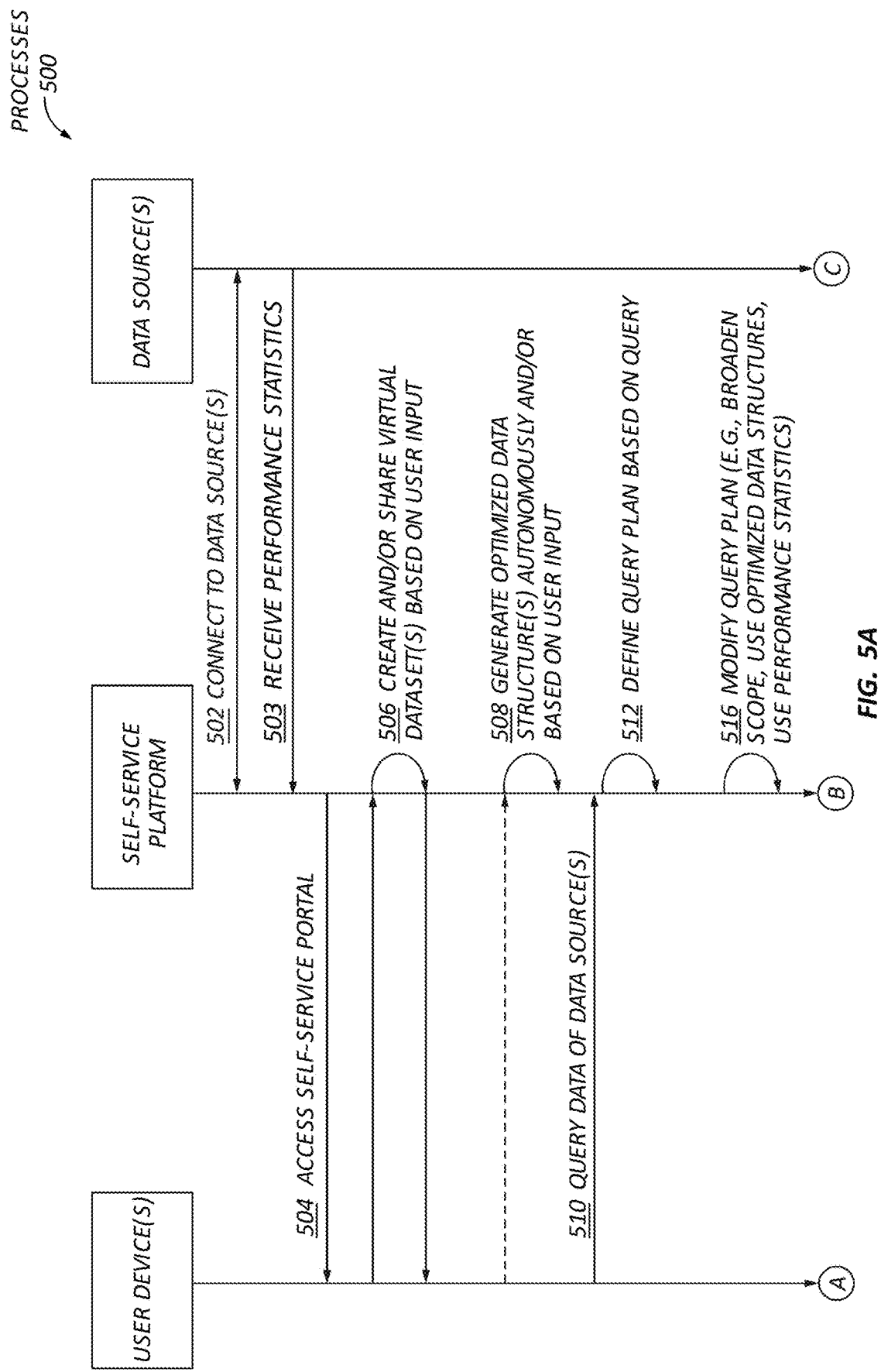
FIGS. 5A and 5B show a flowchart illustrating processes of a self-service platform according to some embodiments of the present disclosure.
Figure 5B:
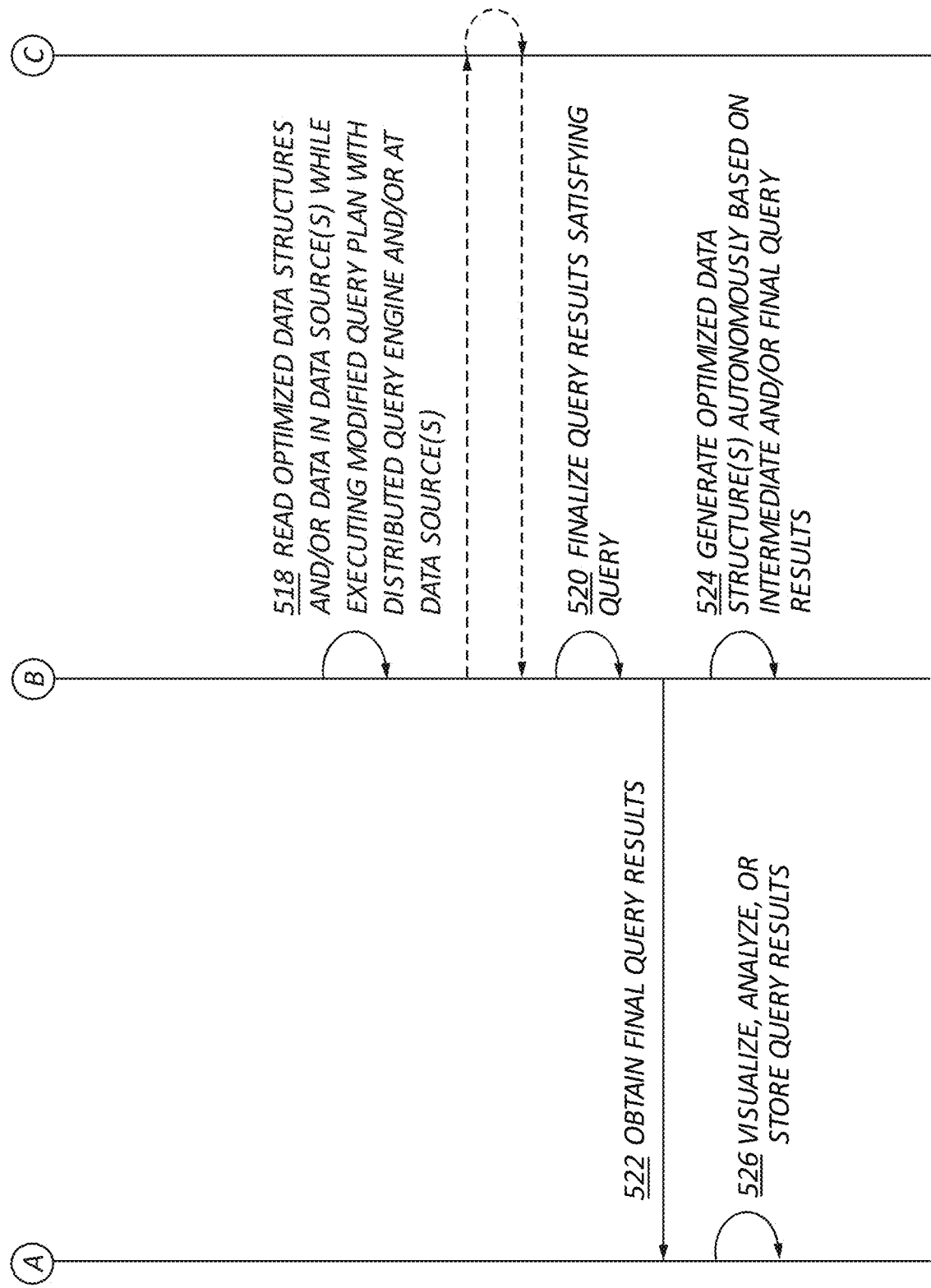

FIGS. 5A and 5B show a flowchart illustrating processes of the platform according to some embodiments of the present disclosure. In step 502, the platform is connected to one or more data sources. In step 504, a user device displays a self-service portal of the platform on a display of the user device. For example, the user may open a web portal administered by the platform that enables the user to query data sources connected to the platform in step 502. In step 506, a user may use a visual dataset editor of the portal to create a virtual dataset and/or share the virtual dataset with other users. The process for creating and sharing virtual datasets is optional and described elsewhere in this disclosure.

In step 503, the platform may determine or receive statistics or capabilities information of data sources. The statistics or capabilities can be used to formulate an optimal search plan for executing a query as detailed below. In some embodiments, the statistics or capabilities information can be obtained after receiving the query and stored in a local memory. As such, the platform can retrieve the statistics and capabilities information from the local memory when needed to define a query plan.

In step 508, the platform generates an optimized data structure. The decision to generate the optimized data structure may be autonomous and the process for generating the optimized data structure can be automatic. In some embodiments, the decision to generate the optimized data structure may be based on user input. In some embodiments, the decision and/or process for generating the optimized data structure can be based on a combination of autonomous, manual, or automatic steps.

In step 510, the platform receives a query from the user device. The query may refer to physical datasets and/or virtual datasets. The query may be received from a client device over a network coupled to a coordinator of the platform. In some embodiments, the query is received via ODBC, JDBC, or REST.

In step 512, the platform executes a process to define a query plan based on the received query. For example, the query plan can define the operators that make up the computation for the query.

A supported operator may refer to an operator that a data source is capable of supporting. For example, NOSQL databases and query engines only support a subset of operators required to implement complex queries. For example, MONGODB can perform aggregations but not joins. In some cases, capabilities of a data source depend on the how data is organized by the data source. For example, ELASTICSEARCH cannot perform an equality filter on a field that is tokenized.

A code generation refers to code that a data source is capable of generating. For example, the disclosed platform can leverage extensibility mechanisms of NOSQL databases. When interacting with an ELASTICSEARCH cluster, portions of the query may be compiled into GROOVY or PAINLESS scripts that are injected into the ELASTICSEARCH query. When interacting with a MONGODB cluster, portions of the query may be compiled into JavaScript code that runs in MONGODB's MAPREDUCE framework.

An execution speed may refer to a speed at which data sources can execute operators. That is, some data sources may execute certain operators faster than others. For example, ELASTICSEARCH projections are relatively slow such that it is usually better to pull an entire record to perform a projection. As such, the query plan may execute a portion of the query on a data source that operates faster than others.

A data distribution may refer to how data is distributed across data sources. That is, the query plan can be configured to take advantage of how data is organized in a data source. For example, data contained in the data source may be organized in such a way that querying that data source reduces the overall amount of time required to obtain query results included on that data source. For example, ELASTICSEARCH parent-child relationships can collocate matching records from different datasets such that a join between the two datasets does not require any data shuffling. As such, a query plan may prefer to execute a portion of a query on a data source that reduces query time by avoiding shuffling over a data source that does not avoid shuffling.

A network throughput and latency consideration refers to whether network throughput and latency affects the process of obtaining query results. For example, a query plan may give preference to performing query operations locally at the data sources to a greater extent. For example, if a slow network exists to a particular data source, the query plan can be configured to push down operations to the data source and transfer the query results after executing the pushed-down operations.

For example, the platform may normally be able to aggregate data faster locally compared to aggregating the data at a data source. Under normal network conditions, it would be preferable to receive data from the data source and aggregate the data locally at the platform. However, under slower network conditions, it is preferable to aggregate data at the data source and transfer the aggregated data over the network rather than transferring un-aggregated data for aggregation by the platform. On the other hand, if daemons of the platform are co-located with data sources, the cost of transferring data is relatively low such that the location where data is aggregated would not negatively affect query execution.

A data source SLA consideration refers to constraints imposed by a SLA. For example, a user may want to minimize the load of queries on a database to avoid violating a SLA. In these instances, the platform can take the SLA into account when deciding what portion of a query should be applied to the database to avoid breaching its SLA.

In some embodiments, the query plan can be defined to carry out operations in a distributed mode. The portions of the query can be executed across a number of nodes and may be executed in a phased manner. As such, operations distributed across non-relational data sources can be parallelized in phases. For example, a query may include an aggregation operation. A query optimizer of the platform may determine that the aggregation can be applied to a MONGODB database. Rather than requesting the MONGODB database to perform the entire aggregation, the query plan may require each MONGODB node (i.e., MONGOD daemon) to perform a local aggregation on a single shard of data, and each of these local aggregations are returned to a potentially different thread in the platform cluster. This allows execution to continue in parallel in the cluster.

The platform may define the query plan based on the relational model and other considerations. For example, the query plan may be defined based on the collected information including the functional abilities of the data sources and other parameters described elsewhere in this disclosure. For example, a query plan may employ execution capabilities of a data source at a query planning phase, optimization phase, or query execution phase.

In step 516, the query plan is modified to utilize optimized data structure(s) in lieu of querying the data sources directly for query results. In some embodiments, the original process for defining the query plan may consider any available optimized data structures including their ordering, partitioning, and distribution. In other embodiments, the defined query plan is re-defined based if optimized data structures that could accelerate query execution have been identified. In some embodiments, the query plan may be broadened, modified to use optimized data structures, and/or modified to use the performance statistics obtained in step 503.

In step 518, execution of the modified query plan begins with executors obtaining data into buffers from data sources. The executors can read physical datasets contained in remote data sources and/or optimized data structures contained in the autonomous memory. The data is read while executing the modified query plan with a distributed query engine of the platform and/or the data sources.

In step 520, the platform obtains query results that satisfy the received query. Further, obtaining query results from multiple data sources can be performed in parallel and/or in phases. The data may be obtained from optimized data structures in an autonomous memory (e.g., PARQUET files) and/or the underlying datasets. When reading from a data source, the executor can submit native queries (e.g., MONGODB Query Language, ELASTICSEARCH Query DSL, MICROSOFT TRANSACT-SQL) as determined by the optimizer in the planning phase.

In some embodiments, intermediate query results obtained from data sources and/or the autonomous memory are combined to produce final query results that satisfy the query. For example, one executor can merge data from other executors to produce the final query results. The merged data can be streamed as final query results to a coordinator of the platform.

In some embodiments, the platform can use high-performance columnar storage and execution powered by APACHE ARROW (columnar in memory) and APACHE PARQUET (columnar on disk). APACHE ARROW is an open source project that enables columnar in-memory data processing and interchange. In some embodiments, the execution engine of the platform can use APACHE ARROW. The data in memory can be maintained in the ARROW format, and there could be an API that returns query results as ARROW memory buffers.

APACHE PARQUET is an open source project that enables columnar data storage. It has emerged as a common columnar format in HADOOP and cloud computing ecosystems. Unlike APACHE ARROW, which is optimized for in-memory storage and efficient processing in CPU, PARQUET is optimized for on-disk storage. For example, it utilizes encoding and compression schemes, such as dictionary and run-length encoding, to minimize footprint and I/O. The platform may include a high-performance PARQUET reader that reads PARQUET-formatted data from disk into ARROW-formatted data in memory. The PARQUET reader enables fast processing of raw data as well as reflections in a cache. Further, it includes capabilities such as intelligent predicate push-downs and page pruning, in-place operations without decompressing data, and zero memory copies.

In step 522, the client device receives the final query results from the platform. The final query results may be rendered as text or a visualization, persisted, or a calculation may be performed on the final query results (e.g., step 526). The user can also operate the portal connected to the platform to view, manipulate, and analyze the final query results.

In step 524, the platform can generate optimized data structures based on the final query results rather than the datasets of the data sources. The decision to generate the optimized data structure may be autonomous or based on user input. Further, the process for generating the optimized data structures may be automatic. The newly created data structures can be used to accelerate subsequent query executions based on subsequent received queries.

Although FIGS. 5A and 5B illustrate a particular series of steps, the disclosure is not so limited. Instead, many of the steps described above can occur in different orders or omitted. For example, the user device need not visualize query results as shown in step 526 and the platform need not generate any optimized data structures based on query results. Further, the platform may receive the performance statistics of step 503 at any time or never obtain these statistics at all.

Dynamic and Unknown Schemas

Embodiments of the platform can handle dynamic schemas and schema uncertainty. A dynamic schema refers to a schema for a data source that changes or a data source that contains mixed data types. Dynamic schemas are common in non-relational data stores. For example, a data source such as MONGODB may have a single column including values for different data types (e.g., varchar, map, integer).

The platform can handle mixed data types of a data source. For example, the platform can determine that a column or field has a mixed data type. If so, it can cause display of a visual indicator to a user and enable a user to address the situation by modifying the column to include only a single data type or split the column into multiple columns with respective data types. The platform can then support BI tools and other SQL-based applications that require each column to have a single data type. Accordingly, the disclosed platform provides a way for users to prepare data for analysis with BI tools.

This "single data type" approach converts mixed data types into a single data type. The user may specify a desired data type, and the platform either deletes entries with values that cannot be converted into the specified data type or replaces those values with a specified value such as "NULL." On the other hand, a "split by data type" approach splits a column with mixed data types into a column for each data type. For example, if the column foo has a mix of map and text, the column is split into a foo_map column and a foo_text column. The platform can use the value NULL in place of the missing values in each column.

Schema uncertainty refers to the situation where a schema of a data source is unknown to a system attempting to query that data source. For example, the schema may not be explicitly defined for a data source. As such, the platform has no way of knowing the structure of datasets contained in the data source prior to executing query operations on the data source. As a result, the platform must operate with schema uncertainty.

Existing systems may assume that all data has an explicitly defined schema, particularly in approaches to data virtualization. This assumption holds when dealing with relational data sources but not when dealing with non-relational data sources such as NOSQL databases and files. For such data sources, existing approaches rely on either an administrator to manually specify a schema before data could be queried, or to examine a sample of data stored in the data store to approximate a schema.

The platform can compensate for schema uncertainty with "schema learning" or as "schema pass-through." That is, the platform can handle the situation where a data source does not advertise a schema for use by the platform. For example, MONGODB collections and JSON files are effectively schema-free. Further, when querying a file directory (e.g., in S3, HDFS), even if each file has a defined schema, files are added or removed to or from the directory such that the overall schema may change.

In schema learning, the platform can automatically learn a schema for a dataset. Initially, the platform estimates a schema based on sample data from a data source. A sample may be incomplete when it does not reflect a schema of all data. Hence, there is no guarantee that the estimated schema is accurate or complete. As the platform executes queries, the current schema is updated when the query execution engine observes data that does not match the currently assumed schema. In some cases, the query execution may not be able to continue because the query was originally compiled based on the assumed schema. In these cases, the platform automatically recompiles the query and restarts the execution with a newly learned schema.

In schema pass-through, the platform can propagate changes of a dataset with a dynamic schema. For example, a user may want to add a calculated field as a new virtual column to a MONGODB collection. In this case, the virtual dataset should include all the fields in the MONGODB collection as well as the additional calculated field. If new fields are added to the MONGODB collection, the virtual dataset could reflect additions. To enable schema pass-through, the platform can support a way to perform wildcard-selection of columns in a virtual dataset. For example, "SELECT *, stars+10 FROM mongo.yelp.business" adds one additional column to all (*) the columns in the parent dataset (mongo.yelp.business). In some cases, rather than adding a column, a user can transform one column while allowing any other column to pass-through. For example, a query could be "SELECT * EXCEPT city, UPPERCASE (city) AS city FROM mongo.yelp.business". The expression "* EXCEPT city" refers all the columns except city. The query could also be: "SELECT UPPERCASE(city) AS city, . . . FROM mongo.yelp.business" where "." represents all columns other than those with the same names as those explicitly mentioned. There are many other syntaxes that could be used to allow pass-through of columns that are not explicitly called out.

Namespace and Path Structures

Embodiments of the platform include a hierarchical namespace for physical or virtual datasets. The path to a location of a dataset is indicated with a pathname including path components separated by dots or slashes. For example, production.website.clicks may refer to a MONGODB collection named "clicks" stored in a MONGODB database named "website" in a MONGODB cluster named "production." The "production" can be defined by a user when establishing a connection to this data source, and the "website" and "clicks" can be obtained from the MONGODB cluster.

A path to a dataset for file-based data sources (e.g., HDFS and S3) may include a variable number of path components. A dataset in such a source may reflect a single file or a directory of similarly structured files (e.g., a directory of log files). For example, a path to the file or directory at/path/to/clicks in a HADOOP cluster could be datalake.path.to..clicks if the connection to the HADOOP cluster was established with the name datalake.

The platform can expose dataset information when connected to data sources. For example, the disclosed platform must expose metadata information such as schemas and tables to SQL-based clients such as TABLEAU, which requires knowing about all datasets that can be queried. For a database-style data source (e.g., ORACLE, MONGODB, or ELASTICSEARCH), elements of the database that are queryable are known. Examples of such elements that reflect queryable datasets include ORACLE tables, MONGODB collections and ELASTICSEARCH types, or the like, which can provide a fast way to retrieve the list.

Identifying queryable datasets in file-based data sources (e.g., HDFS, S3) can be challenging because each and every file or directory is not necessarily queryable. For example, image and video files in a file-based data source cannot be queried as a dataset. In addition, a rapid way to retrieve a list of all queryable files typically does not exist. As such, the platform would have to traverse the entire file system, which is computationally prohibitive because it might contain millions or billions of files.

To overcome these challenges, the platform can learn over time what data in a file system can be treated as queryable datasets. The platform is not aware of the files or directories in the data source because there is no record of the files or directories in the metadata store of the platform. Thus, all files or directories of the data source can be initially presumed as non-queryable datasets.

The file system can receive an external query such as one that was submitted through a third party client application that references a non-queryable dataset file or directory. If the platform is able to read the data in that file or directory, it is thereafter considered a queryable dataset. This could include intelligent automatic identification of file formats based on file extensions (e.g., ".csv") and data profiling. If the platform is unable to read the data in that file or directory, an error is returned to the client application, and the file or directory remains a non-queryable dataset.

If the platform receives a query through its own portal that references a non-queryable dataset file or directory, the platform can prompt the user to specify format options (e.g., line and field delimiters in the case of text files) and can then run the query. The platform may decide not to prompt the user if the file or directory is self-describing and there is no need for any format options. The file or directory is considered a queryable dataset once the user provides the format options. In some embodiments, the user can explicitly mark a file or directory as a queryable dataset through its own portal or API. In addition, specific interactions such as clicking on a file in the portal can also have the effect of making a non-queryable dataset into a queryable dataset. In some embodiments, the user can also convert a file or directory into a non-queryable dataset.

The platform can learn over time which files or directories of a data source represent queryable datasets. Any file or directory (including non-queryable datasets) can be queried via a SQL query at any time. However, only known queryable datasets are advertised in the metadata that is returned to external client applications. For example, a TABLEAU user is only able to select known queryable datasets in the TABLEAU UI, although the user is able to use TABLEAU's Custom SQL feature to query even a non-queryable dataset file or directory.

Data Intelligence

Embodiments of the platform enable users to interact with diverse data types from diverse data sources with relative ease. A user can interact with any datasets or any data sources via a portal provided by the platform. For example, the user can readily transform datasets, join datasets with other datasets, and the like. Typically, only a limited number of users are sufficiently technically savvy to specify exactly what operations need to be performed. To improve ease of use, the platform can be designed to make suggestions to users. For example, if a user is viewing a dataset and clicks a join button, the platform can automatically recommend other datasets that can be joined with the viewed dataset, as well as the join conditions (e.g., a formula for how to perform the join).

As users interact through a portal or through external systems via interfaces such as JDBC and ODBC, the platform can use machine learning (ML) and artificial intelligence (AI) to identify query patterns. The ML/AI allows the platform to present users with better choices, identify both ideal patterns and patterns to be avoided. Examples include join recommendations, common multistep preparation and transformation patterns, common value filtering, aggregation patterns, frequent calculated fields, preexisting datasets that might include what is desired (i.e., "similar datasets")

Security and Governance

Security and data governance are critical to any enterprise. However, the increasing complexity and demand for data often leads to data sprawl, resulting in significant security risks. The platform enables users to discover, curate, accelerate, and share data without having to export copies of data into ungoverned systems including disconnected spreadsheets, BI servers, and private databases. This reduces the risk of unauthorized data access as well as data theft. In particular, the platform provides a virtual security layer with security and governance capabilities including lineage, authentication, access control, auditing, and encryption.

The platform may maintain a record of lineage for every dataset including those personal to a user. As such, an administrator can easily determine how a dataset was created, transformed, joined, and shared, as well as the full lineage of these steps between datasets. That is, datasets are connected and the administrator (or any other permitted user) can browse ancestors and descendants of each dataset and column.

The platform may support multiple authentication modes. For example, user accounts can be managed inside the platform in an embedded mode. In contrast, the platform can also connect to an existing LDAP-based directory service such as Active Directory. The platform can rely on the directory service for verifying credentials and checking group membership in an LDAP/Active Directory mode.

The platform can also support granular access controls including physical dataset permissions that control which users and/or groups can query a specific physical dataset, and virtual dataset permissions that control which users and/or groups can query a specific virtual dataset. The access controls may include column-level permissions used to restrict access to sensitive columns in a dataset by specific users. The column-level permissions can be set via SQL or the UI. The access controls may also include row-level permissions that can be used to restrict access to a subset of the records in a dataset for specific users. The row-level permissions can also be set via SQL or the UI.

A user can also set access controls at a column or row level by creating a virtual dataset. For example, an owner of a database can create a connection to the database. However, rather than allowing others to query the physical datasets of that database, the owner can derive virtual datasets that limit exposure of the physical datasets. For example, the owner may create a derived virtual dataset that includes only a subset of columns or rows of a physical dataset. The owner can deny access to the physical dataset while enabling access to the derived virtual dataset. As such, the derived virtual dataset effectively limits access to data of the physical dataset. In addition, a masking instruction could operate to mask specific columns or rows of a dataset. As such, exposure of data can be limited per user and at different levels of granularity.

The platform may enable users to collaborate and selectively share or grant access to data. A user of a dataset (e.g., owner or administrator) can designate users or groups that can query that dataset. The platform can transparently construct a complex SQL statement based on the access control setting such that data returned to different users may differ depending on the identities of the users. For example, a UI may enable the owner of a physical or virtual dataset to set levels of access to that dataset for different users or groups. For example, the user can specify that users that belong to a marketing department group can only see records that meet a specific condition or only see a masked version of a credit card column.

The disclosed access control capabilities may include user impersonation to enable controlling which users can query a particular dataset. In particular, a data source or virtual dataset can be setup in owner mode or impersonation mode. In owner mode, the identity of the data source or dataset owner is used. In impersonation mode, the identity of the end user is used. In some embodiments, impersonation mode can support using the identity of the child dataset that is being queried (which, in turn, may be in owner or impersonation mode).

When establishing a data source in owner mode, access to a data source may require the owner of the data source (i.e., whoever defines that data source) to provide master credentials. However, when establishing a data source in impersonation mode, the owner does not need to provide master credentials to access the data source because the identity of the end-user is used to access the data source.

Although some data sources (e.g., HADOOP) allow impersonation without any credentials via a trust relationship, some data sources (e.g., MONGODB, S3) require credentials. For sources that require credentials, there are two ways in which to obtain the required credentials to impersonate a user to a data source.

In one embodiment, a required credential can be obtained and maintained per session. If the platform determines that it needs to access a data source with the identity of an end user, the platform may be able to use the credentials with which the user authenticated to the platform when logging in through the platform's UI or connecting with a BI tool. These credentials are maintained by the platform in the context of the user's session with the system, and do not need to persist long-term.

In another embodiment, the required credential can be obtained and maintained in a keychain. The password for a user to connect to a platform does not necessarily work for some data sources. For example, S3 uses randomly generated keys rather than passwords such that the user's password, as well as the username, does not work to access files in S3. In some embodiments, the platform maintains a multiuser keychain as a sparse matrix that holds the credentials for each <data source, user> tuple. When the platform seeks to query a data source with the identity of a specific user, it consults the keychain to see if the keychain contains credentials for that data source and user. If not, the platform can prompt the user to enter credentials for that data source.

The platform may have auditing capabilities. This allows a user to monitor who is accessing particular data and identify the time when the data was accessed. In some embodiments, the platform can generate real-time reports showing, for example, the top 10 users of a given dataset, and off-hours access. The platform can track and record user activity, including all query executions. This serves as a single view that shows who is accessing what data. For example, a Jobs section of the UI can provide details of all query executions, enabling IT professionals to monitor the system for suspicious activity and identify instances of unauthorized data access.

The platform may have encryption capabilities. For encryption on the wire, the platform can leverage both TLS (SSL) and KERBEROS. For each data source, the platform can support the standard wire-level encryption scheme of the source system. For example, when connecting to a secure HADOOP cluster, the platform can communicate securely with the HADOOP services via KERBEROS. For encryption at rest, the platform can leverage encryption capabilities of the autonomous memory (e.g., HDFS, AMAZON S3). When the autonomous memory is on direct attached storage (i.e., the local disks of the cluster), encryption can be provided via self-encrypting drives or encryption at the operating system level.

Autonomous Memory

As indicated above, the disclosed embodiments include an autonomous memory (also referred to as a reflections data store) configured to materialize data of data sources. The materialized data may enable the platform to produce query results from the data sources without needing to connect to the data sources. Thus, the reflections data store contains the optimized data structures that are used at query time when available rather than relying solely on the data sources.

In some embodiments, the reflections data store is a persistent cache used to accelerate query executions. The cache can live on HDFS, MAPR-FS, cloud storage such as S3, or direct-attached storage (DAS). The cache size can exceed that of physical memory. This architecture enables caching more data at a lower cost, resulting in a much higher cache hit ratio compared to traditional memory-only architectures.

Figure 6:
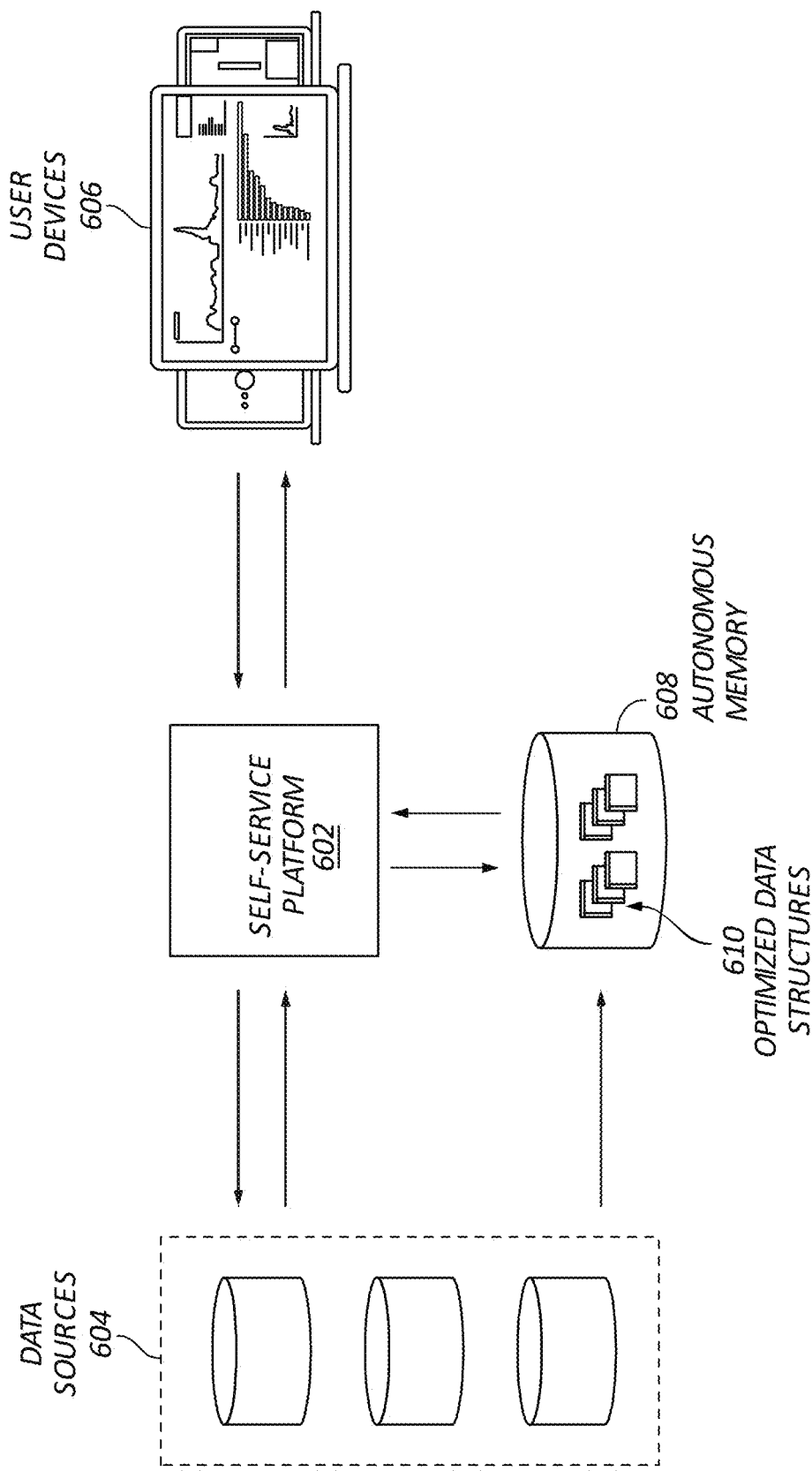
FIG. 6 is a block diagram illustrating an acceleration system of a self-service data platform according to some embodiments of the present disclosure.

FIG. 6 is a block diagram illustrating an acceleration system for the platform 602 according to some embodiments of the present disclosure. The acceleration system may include an autonomous memory 608 configured for use to accelerate a query execution process. In some embodiments, the platform 602 may include or is separate from the autonomous memory 608, the acceleration system can include the platform 602, can be included in the platform 602, or can be separate from the platform 602.

The platform 602 is communicatively coupled to one or more data sources 604 and one or more user devices 606. An autonomous memory 608 is communicatively coupled to the data sources 604 and platform 602. The autonomous memory 608 may include a combination or cluster of in-memory storage, on-disk storage, a distributed file system (e.g., HDFS), a blob or object store (e.g., AMAZON S3), or a database. The autonomous memory 608 contains optimized data structures 610.

The query results of a query are more rapidly obtained by using the autonomous memory 608 because its optimized data structures 610 are optimized for complex queries on datasets from data sources 604 such as relational and non-relational data sources. Further, the autonomous memory 608 can be local to the platform 602 to avoid network issues such as bottlenecks, latency, and the like. The process for obtaining query results is accelerated relative to applying the query exclusively to the data sources 604. In particular, upon receiving a query for data contained in the data sources 604, the autonomous memory 608 can be queried in lieu of querying the data sources 604 or in addition to querying the data sources 604. Hence, the process for obtaining query results is accelerated because the platform 604 can avoid querying remote data sources.

The query operations involving the autonomous memory 608 are transparent to users of the user devices 606 that submit queries. In contrast, known techniques for improving query performance (e.g., OLAP cubes, aggregation tables, and BI extracts) require a user to explicitly connect to optimized data. Accordingly, users of user devices 606 can submit queries to the platform 602, which can automatically and transparently accelerate query execution by using any optimized data structures 610 available in the autonomous memory 608.

Figure 7A:
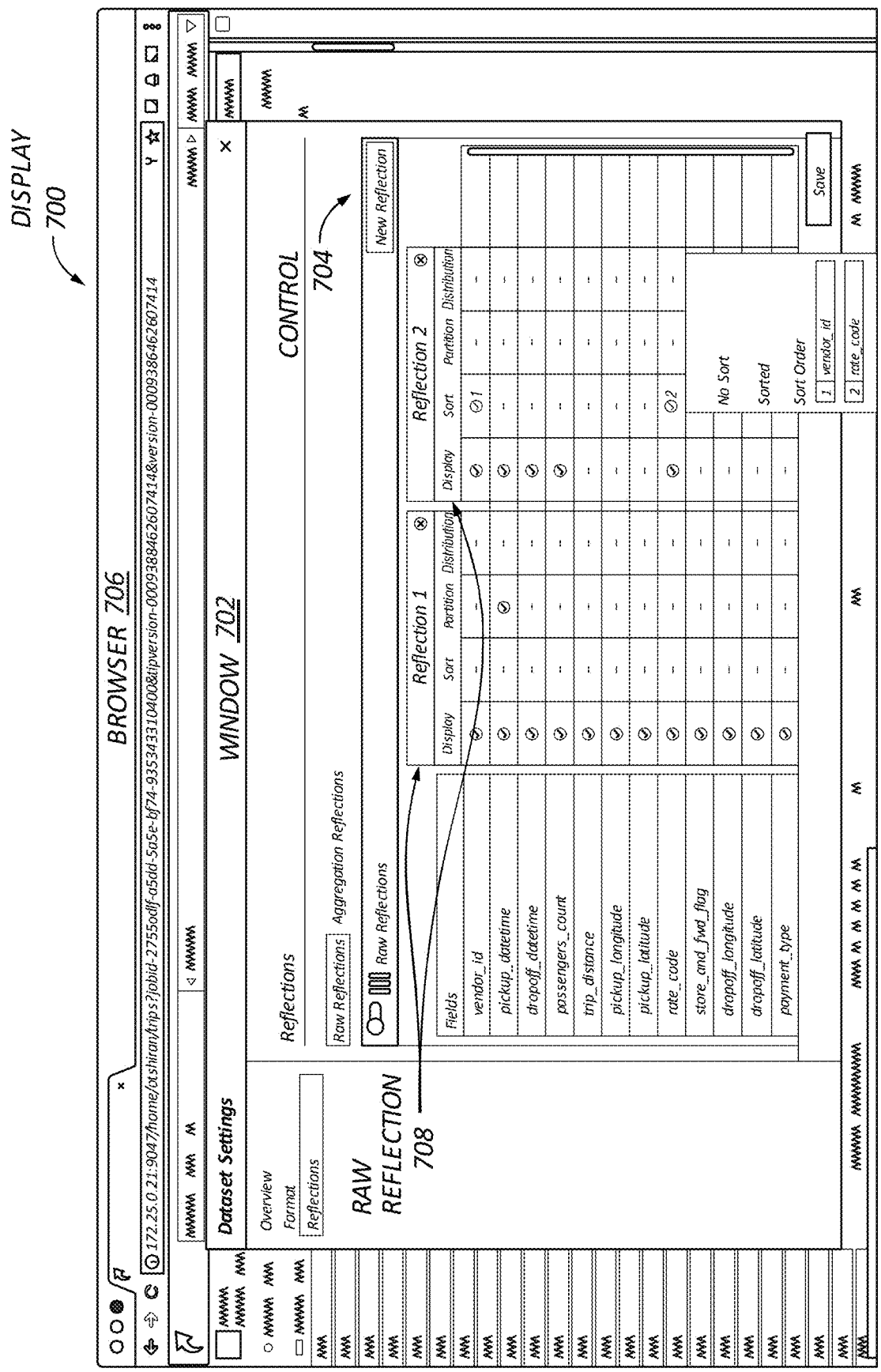
FIG. 7A illustrates a view of a display for interacting with a self-service data platform according to some embodiments of the present disclosure.

FIG. 7A illustrates a view of a display 700 rendered on a display of a user device 606 according to some embodiments of the present disclosure. As shown, the display 700 has a dataset settings window 702 including controls (e.g., control 704) that allow a user of the user device 606 to manage settings of optimized data structures (e.g., reflections). As shown, the dataset settings window 702 is rendered by a browser 706 running on the user device 606 connected to the platform 602 over a network such as the Internet. The dataset settings window 702 shows a raw reflections 708. A user of the user device 606 can view or modify the raw reflections 708 by using controls via the display 700, in which case the platform creates and stores the changed raw reflections 708 in the autonomous memory 608 for subsequent use during query time.

Figure 7B:
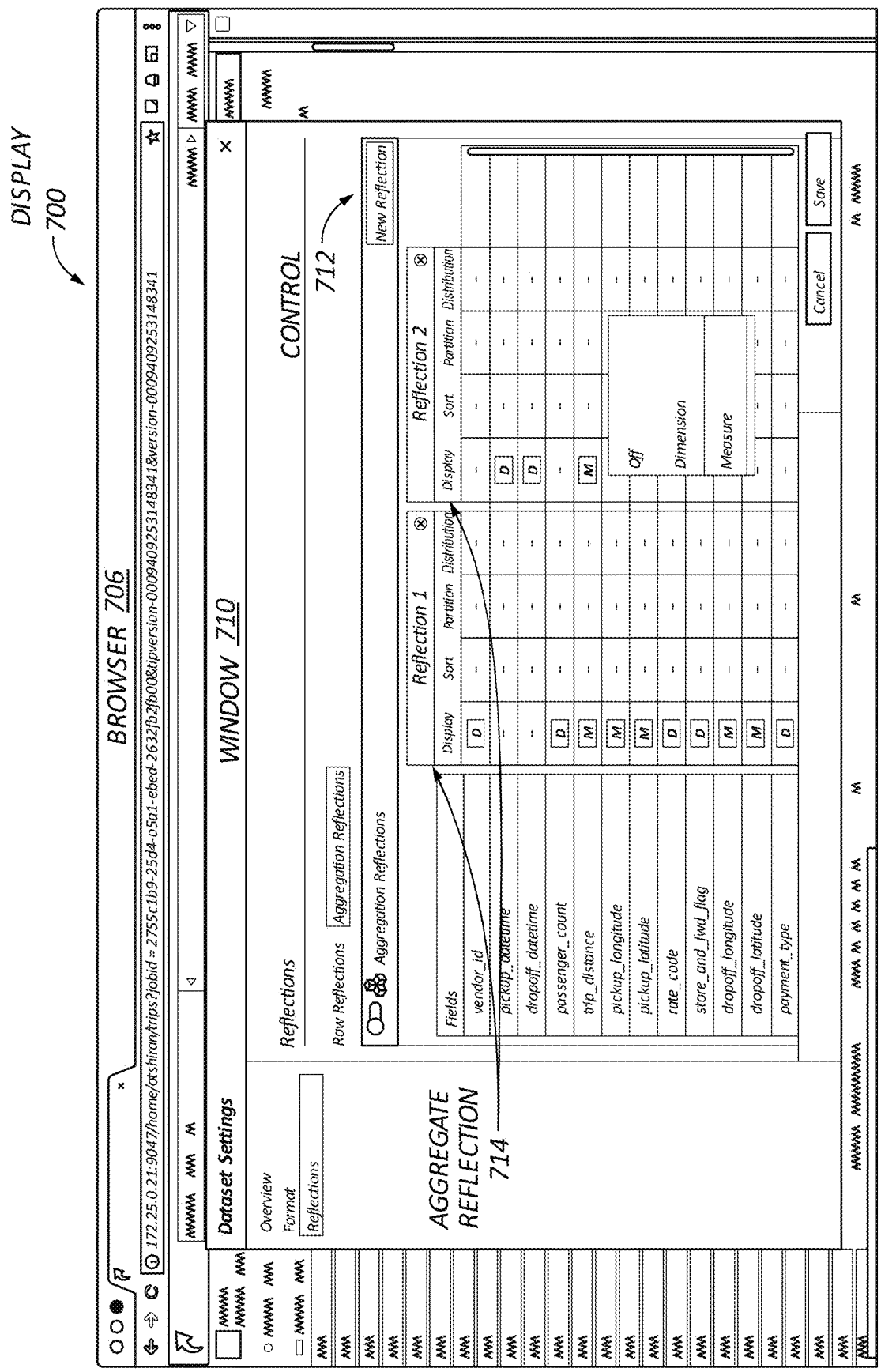
FIG. 7B illustrates another view of a display for interacting with a self-service data platform according to some embodiments of the present disclosure.

FIG. 7B illustrates another view of the display 700 rendered on the display of the user device 606 according to some embodiments of the present disclosure. As shown, the display 700 has a dataset settings window 710 including controls (e.g., control 712) that allow a user of the user device 606 to manage settings of optimized data structures. As shown, the dataset settings window 710 is rendered by the browser 706 running on the user device 606 connected to the platform 602 over a network such as the Internet. The dataset settings window 710 shows aggregate reflections 714. A user of the user device 606 can view or modify the aggregate reflections 714 by using the controls via the display 700, in which case the platform creates and stores the changed aggregate reflections 714 in the autonomous memory 608 for subsequent use during query time.

As indicated above, the platform can include an optimizer configured to optimize a query plan defining the execution of a query. The optimizer can explore opportunities to utilize optimized data structures contained in the autonomous memory rather than processing the raw data in the data sources at query time. In some embodiments, the query results satisfying a query can be obtained more rapidly from the autonomous memory rather than the data source. Further, the computational cost is reduced by utilizing autonomous memory in lieu of data sources. As such, the optimizer may consider all the optimized data structures in the autonomous memory when a new query is received and automatically define a query plan to utilize optimized data structures when possible.

In some embodiments, the optimizer may include a two phase algorithm. In a pruning phase, the optimizer disregards any optimized data structures in the autonomous memory that are irrelevant because their logical plans have no physical datasets in common with the query's logical plan. In other words, any optimized data structures that are not based on physical datasets within the scope of the query are excluded from the query plan. In a sub-graph matching phase, the optimizer uses a hierarchical graph algorithm to match sub-graphs of the query's logical plan with logical plans of any remaining optimized data structures.

Figure 8A:
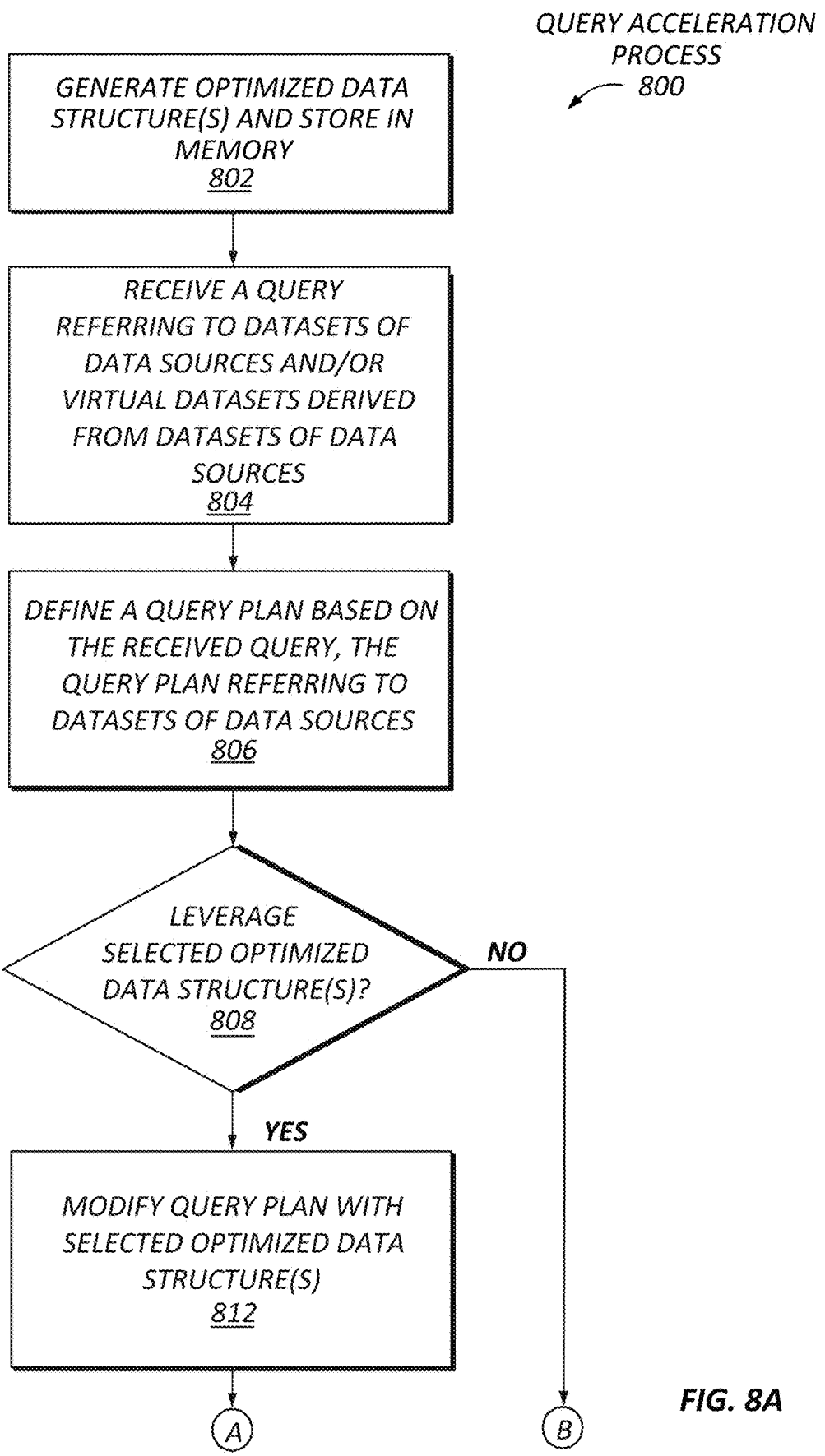
FIGS. 8A and 8B show a flowchart illustrating a process for accelerating a query execution process according to some embodiments of the present disclosure.
Figure 8B:
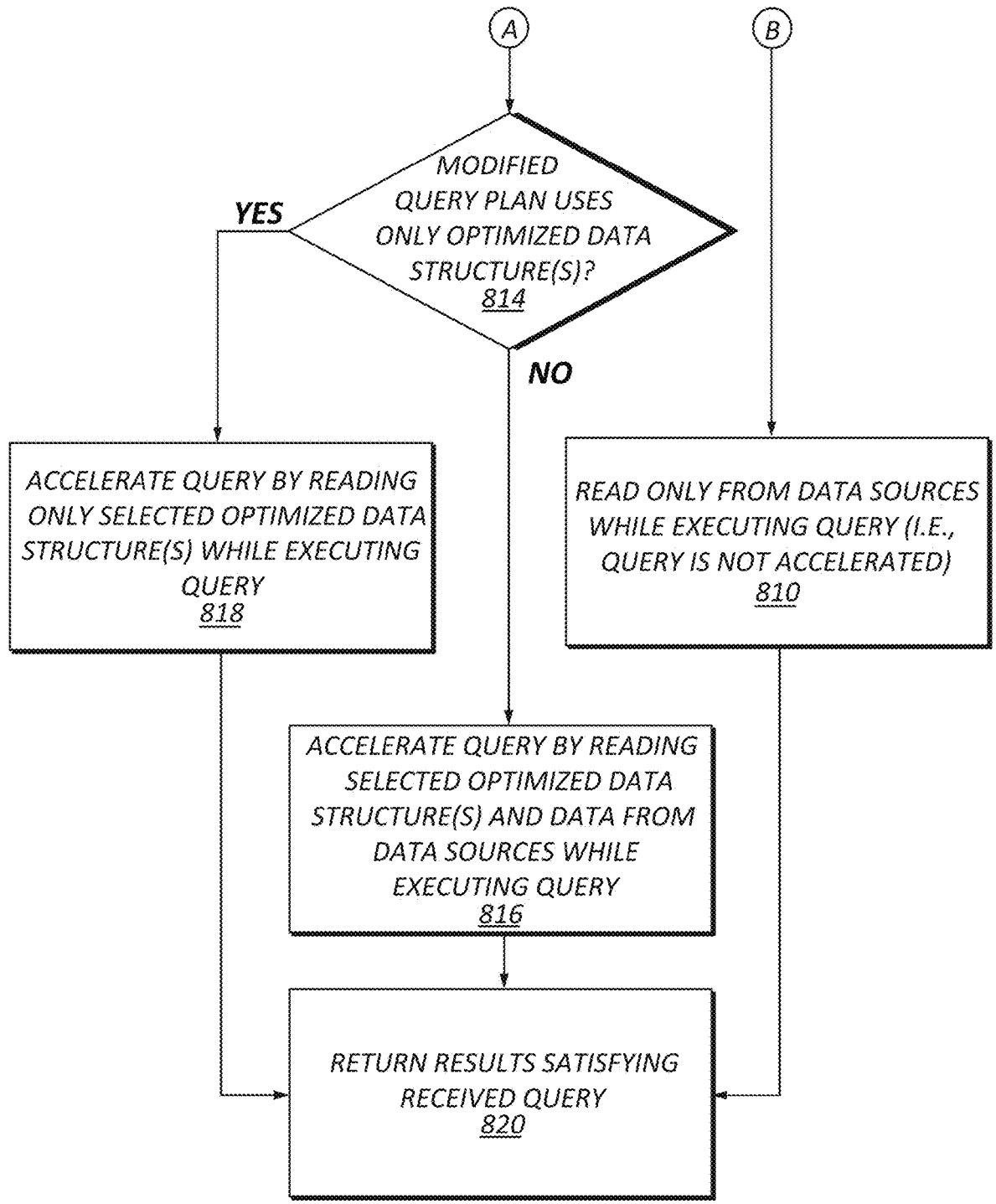

FIGS. 8A and 8B show a flowchart illustrating a process 800 for accelerating query execution according to some embodiments of the present disclosure. The query execution can be accelerated by using optimized data structures (i.e., reflections) contained in an autonomous memory (i.e., reflections data store). Hence, in step 802, data is materialized for the autonomous memory as optimized data structure(s). For example, an algorithm can determine the data to materialize in the autonomous memory and/or data can be materialized based on user input that explicitly indicates what to materialize. The process for deciding and generating materialized data is described elsewhere in this disclosure.

In step 804, the platform receives a query from a client device. For example, the platform may receive a query referring to datasets of data sources, and/or virtual datasets derived from datasets of data sources. In step 806, the platform defines a query plan based on the received query. The query plan may refer to physical and/or virtual datasets. The platform can expand the virtual datasets based on their definitions, resulting in a query plan that refers to physical datasets only. In other words, the platform can recursively substitute virtual datasets with their definitions.

In step 808, the platform determines whether query execution can be accelerated by using optimized data structures of the autonomous memory. In some embodiments, the platform checks whether there are optimized data structures in the autonomous memory that have not expired and which can be used to partially or entirely satisfy the query. For example, assume that the autonomous memory contains an optimized data structure X which corresponds to 'SELECT name, city FROM mongo.yelp.business'. If the platform executes a query 'SELECT name FROM mongo.yelp.business', the platform identifies the opportunity to use the optimized data structure X. A projection is trivial if the cache is columnar. Similarly, if the platform executes the query 'SELECT name, COUNT(*) FROM mongo.yelp.business GROUP BY name', the platform identifies the opportunity to use the optimized data structure X. In this instance, the platform could perform an aggregation (GROUP BY name) and count on X.

In step 808, if the query execution can be accelerated, the platform determines whether the query results can be obtained entirely from the autonomous memory. In step 810, if the query can be computed entirely based on reflections in the autonomous memory, the query plan is modified to include optimized data structures of the autonomous memory and the platform does not need to access the data sources. In step 812, the platform utilizes the autonomous memory to compute results that satisfy the query. In step 814, the results are returned to the client device.

In step 810, if the query execution cannot be accelerated, the query plan is defined to read data from the data sources to compute the query results. The query execution can still be improved without the benefits of the autonomous memory. For example, the scope of the query plan can include a distributed execution to leverage columnar in-memory processing and push-downs into the underlying data sources when seeking data from RDBMS or NOSQL data sources.

In step 812, if the query execution can be accelerated, the query plan is modified with selected optimized data structures to facilitate the acceleration. In step 814, the platform determines whether the modified query plan only needs to read the selected optimized data structures to obtain query results or needs to read the data contained in the data sources as well.

In step 816, if query results can be obtained by reading data from the autonomous memory and data sources, the query plan is modified to include a combination of the optimized data structures contained in the autonomous memory and the datasets contained in the data sources. This can also occur when the platform determines that the overall computational cost of the query is lessened by using the data source such as, for example, when the data source has an index. Hence, the query execution is accelerated by reading the selected optimized data structures in lieu of reading at least some data from the data sources.

The platform then queries the autonomous memory to obtain intermediate query results and queries the data sources to obtain the remaining intermediate query results. In some embodiments, the intermediate query results from the data sources are obtained before obtaining the intermediate query results from the autonomous memory. In some embodiments, the intermediate query results can be obtained in parallel from the autonomous memory and the data sources.

In step 818, if the query results can be obtained exclusively by reading from the autonomous memory, the query plan is modified to include only the selected optimized data structures. Hence, the query execution is accelerated by reading only the optimized data structures while executing the query. Lastly, in step 820, the data (i.e., intermediate query results) obtained by reading from the autonomous memory and/or data sources is merged, finalized, and returned to the user as final query results that satisfy the received query.

The platform can intelligently decide when to generate optimized data structures and what data of the data sources to materialize in the autonomous memory. For example, the platform can make the determination based on user input and/or an algorithm that considers various factors or constraints. For example, the input to the algorithm can include information related to historical queries, historical query patterns or sessions, real-time or current queries, explicit votes (e.g., crowd-sourcing). The platform may also consider physical constraints (e.g., available memory, resource consumption, and desired query runtime) and policy constraints set by an administrator. Several considerations for materializing data follow.

The platform may automatically materialize frequently queried data or data related to the frequently queried data as optimized data structures in the autonomous memory. Specifically, the platform can determine what data and queries are more common than others. The platform can materialize the frequently queried data or data related to the frequently queried data to improve query capabilities with rapid access compared to accessing the data sources directly.

As indicated above, the platform may also materialize data based on user hints. The user hints may be explicit instructions to accelerate queries referring to particular physical or virtual datasets. For example, a user can request to accelerate queries on a particular dataset by creating optimized data structures anchored to that dataset. Optimized data structures in this case are derived from the particular dataset such that queries for that dataset can be applied to the autonomous memory rather than the data source.

The platform may materialize data based on relationships between datasets. The platform knows the relationships between any datasets, and can use this information to determine optimized data structures to create. In particular, the relationships between virtual and physical datasets can influence which optimized data structures the platform will create. The platform can use cost-based factors or heuristics. For example, a minimum-cost threshold can be applied to avoid materializing data if the cost of computing that data on-the-fly is low (e.g., performed quickly). For example, if an underlying dataset is materialized and a derived dataset can be computed based on underlying dataset at a low enough cost, then the derived dataset is not materialized even if the user requests to materialize the derived dataset.

A delta materialization refers to when a virtual dataset has most of its data in common with another physical or virtual dataset that has been materialized. If so, the platform may decide to materialize only the difference between the two datasets (i.e., the delta). For example, if A is already materialized and B is identical to A plus an additional column, then the platform will only materialize the additional column in B to accelerate B. In some embodiments, the platform can generate materialization patterns and an ordering that minimizes materialization maintenance cost. This includes materialization updates that can be partitioned and are data segment aware, as well as data algebra aware.

A common ancestor materialization refers to automatically detecting a common ancestor for multiple virtual datasets or ad hoc queries that need to be accelerated, and assuming the cost of computing these datasets or queries from the ancestor is relatively small. For example, a user may ask to accelerate B and C, but not A. The platform may determine that B and C can be derived from A at a sufficiently low enough computational cost, and therefore decide to materialize A but not B or C.

The common ancestor need not be an actual named dataset; rather, it may be any arbitrary intermediate dataset (which may or may not be expressible in SQL). For example, assume that B is 'SELECT COUNT(*) FROM business GROUP BY state HAVING state="CA"' and C is 'SELECT COUNT(*) FROM business GROUP BY state HAVING state="NY"'. In this instance, the system may decide that instead of materializing both B and C, it is sufficient to materialize an intermediate dataset equivalent to "SELECT state, COUNT(*) FROM business GROUP BY state" because B and C can be cheaply computed based on this intermediate dataset.

An intermediate materialization refers to identifying not only explicit datasets that can be accelerated but can also generalize datasets or create intermediate datasets that did not previously exist to provide ideal acceleration candidates. This can be done to balance materialization coverage and size with required latencies considering factors such as result execution effort, cluster size, and the desire to improve hit ratios for the autonomous memory.

An automatic partition and ordering materialization technique refers to automatically identifying optimal physical data layouts including partitioning, dictionary encoding, and ordering to provide benefits to both materialization maintenance, and results execution performance.

A columnar-aware acceleration refers to the platform taking advantage of the nature of columnar storage formats to accelerate alternative datasets. This allows the platform to reduce dataset duplication and minimize disk read overheads. By understanding data at a column level, the platform can provide optimal performance for multiple related datasets in a single physical data representation. This technique can also include stepwise distinct materialization maintenance steps. This can accelerate availability of common transformation patterns and decrease staleness. By doing this, some columns can be updated more quickly compared to other common transformations that can be deferred or maintained at a decreased frequency.

A CPU-consumption and size-based tiered materialization technique refers to materialization that targets multiple types of storage including spinning disk, SSD, compressed memory, expanded memory, as well as newer technologies including persistent memory. In each instance, the platform allows a user to balance the need for execution performance with the capacity of storage subsystems to provide an optimal scale or performance balance.

An automatic Identification of OLAP-type patterns technique refers to identifying clusters of common analysis patterns done through SQL or third party tools, along with data profiling such that the platform can determine likely relations including table relations, star-schemas, and dimension measures and use these to generate better materialization coverage and support automatic dataset identification and caching in the autonomous memory.

A secondary storage redundancy technique refers to maintaining a connection to primary data sources. The platform can minimize duplication for redundancy purposes by having a strong awareness of primary dataset availability.

In some embodiments, the platform can generate a large number of alternative materializations. In this instance, the platform needs to evaluate a large number of possible supporting optimized data structures during each query execution. To ensure the performance completion of the alternative evaluation and costing, the platform can generate an algebraic data tree structure, which refers to an in-memory and on-disk data structure that allows for high performance evaluation and comparison of multiple optimized data structures for incorporation. This can be supplemented using common alternative caching to provide optimal query completion performance.

Business Intelligence Tool Launcher

In some embodiments, users are enabled to collaboratively manage and prepare (i.e., curate) data via virtual datasets. By leveraging the platform's SQL execution engine and client-side drivers, any SQL-based application (e.g. BI tool) can connect to the platform and issue queries on physical and virtual datasets.

The platform may include capabilities that enable users to jump from data preparation inside the platform's UI to analysis with a SQL-based application. This capability may be referred to as a BI tool launcher. The user can choose the desired application and click a button to launch that application. Data is not extracted or exported from the platform into the BI tool. Instead, the application is initiated with the parameters needed to make a live, direct connection to the platform.

The BI tool can be integrated into the platform using different techniques. For example, an auto-generated connection file can be downloaded to the platform. The auto-generated connection file can initialize the BI tool with a direct connection. For example, in the case of Tableau, a TDS file can be created and downloaded by the user. In another example, a URL handler or browser plugin can be used. When the user clicks the button (or link), the browser receives the connection information and launches the BI tool. In yet another example, the platform can use a direct link or API calls. In the case of server-side or web-based BI tools, the user can be redirected to a special URL which includes the connection information. Alternatively, the platform can use the BI tool's API to configure the connection.

Computer System

Figure 9:
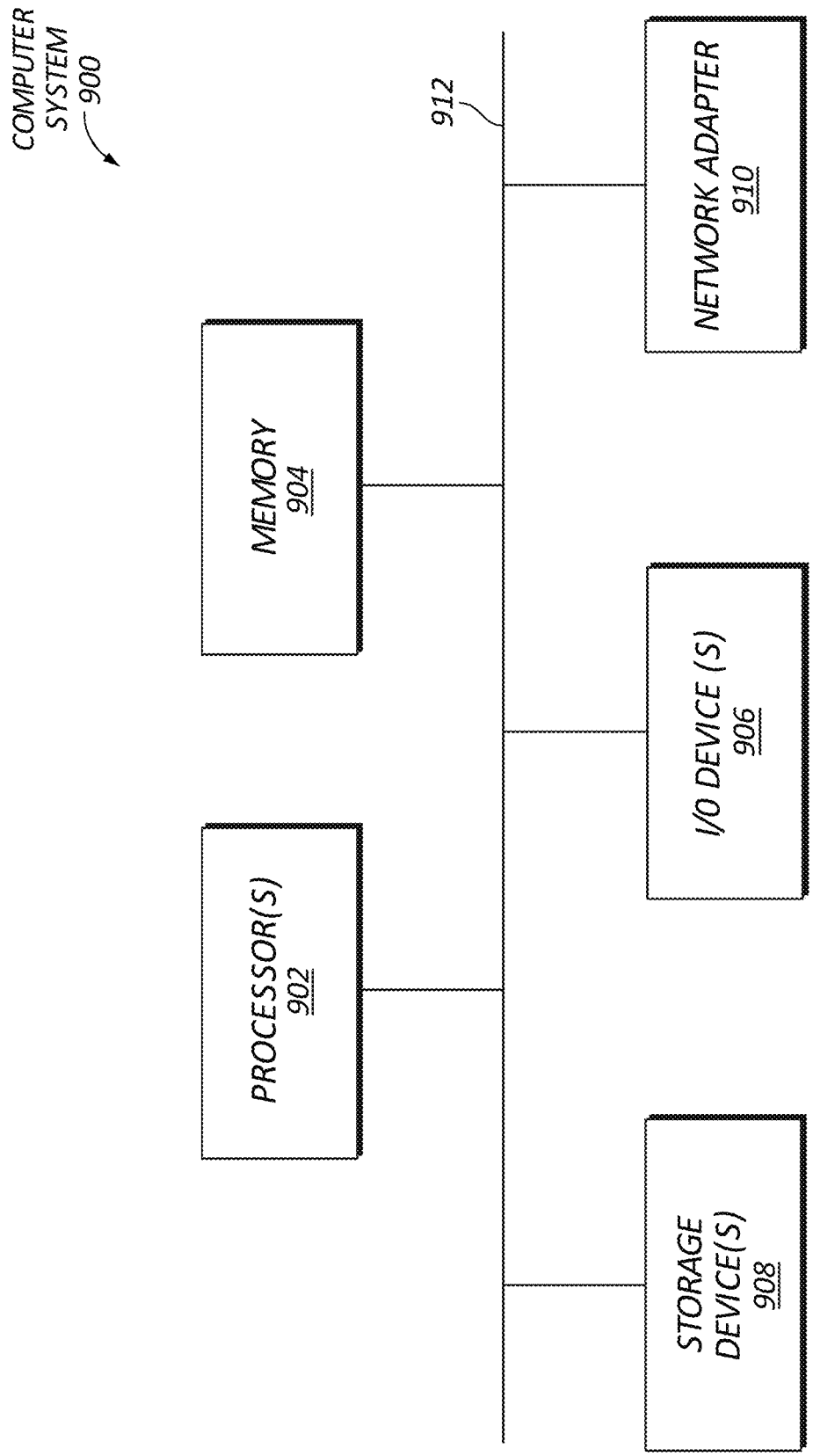
FIG. 9 is a diagrammatic representation of a computer system which can implement some embodiments of the present disclosure.

FIG. 9 is a block diagram of a computer system 900 as may be used to implement certain features of some of the embodiments. The computer system 900 may be a server computer, a client computer, a personal computer (PC), a user device, a tablet PC, a laptop computer, a personal digital assistant, a cellular telephone, an IPHONE, an IPAD, a BLACKBERRY, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 900 may include one or more central processing units ("processors") 902, memory 904, input/output devices 906, e.g. keyboard and pointing devices, touch devices, display devices, storage devices 908, e.g. disk drives, and network adapters 910, e.g. network interfaces, that are connected to an interconnect 912. The interconnect 912 is illustrated as an abstraction that represents any one or more separate physical buses, point to point connections, or both connected by appropriate bridges, adapters, or controllers. The interconnect 912, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called FIREWIRE.

The memory 904 and storage devices 908 are computer-readable storage media that may store instructions that implement at least portions of the various embodiments. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 904 can be implemented as software and/or firmware to program the processor 902 to carry out actions described above. In some embodiments, such software or firmware may be initially provided to the processing system 900 by downloading it from a remote system through the computing system 900, e.g. via network adapter 910.

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed:

1. A method performed by one or more server computers, the method comprising:
    receiving a query by the one or more server computers;
    generating a query plan in memory based on the received query,
        wherein the query plan includes computer instructions configured to include references to physical datasets contained in multiple data sources;
    detecting an optimized data structure in an autonomous memory,
        wherein the optimized data structure can be used to at least partially modify the query plan to satisfy the query;
        based on the received query, refreshing the optimized data structure to remove outdated data and update data stored in the optimized data structure;
    determining that processing of the received query can be accelerated by substituting at least a portion of the query plan to include a reference to the optimized data structure in lieu of a reference to at least one physical dataset of the physical datasets contained in the multiple data sources to satisfy the received query,
        wherein the optimized data structure is based on results from one or more previously processed queries that produced at least one query result from the at least one physical dataset;
    in response to determining that processing the received query can be accelerated, modifying the query plan to refer to the optimized data structure instead of referring to the at least one physical dataset referred to in the query plan; and
    executing the modified query plan to obtain query results by:
        accessing the autonomous memory to utilize the optimized data structure instead of accessing the at least one physical dataset; and
        accessing at least some of the multiple data sources to retrieve data that satisfies the received query.

2. The method of claim 1, further comprising, prior to receiving the query:
    generating the optimized data structure to include raw data of the at least one physical dataset of the multiple physical datasets to result in a raw reflection.

3. The method of claim 1, further comprising, prior to receiving the query:
    generating the optimized data structure to include an aggregation of one or more data columns of the at least one physical dataset of the multiple physical datasets to result in an aggregation reflection.

4. The method of claim 2, wherein the raw reflection comprises at least one of sorted, partitioned, or distributed data of one or more data columns of the at least one physical dataset of the multiple physical datasets.

5. The method of claim 1, further comprising, prior to receiving the query:
generating the optimized data structure to include data sampled from the at least one physical dataset of the multiple physical datasets.

6. The method of claim 1, wherein the received query is a second query and the query results are second query results, the method further comprising, prior to receiving the second query:
generating the optimized data structure based on first query results that satisfy a first query.

7. The method of claim 6, wherein the query plan is a second query plan, and a first query plan is defined to have a scope broader than necessary for obtaining search results satisfying the first query such that the generated optimized data structure is broader than an optimized data structure generated based on a query plan having a scope that is minimally sufficient for obtaining search results satisfying the first query.

8. The method of claim 1, wherein the query results are obtained without reading any of the multiple physical datasets contained in the multiple data sources.

9. The method of claim 1, wherein the query results are obtained by reading at least some of the multiple physical datasets contained in the multiple data sources in addition to reading the optimized data structure.

10. The method of claim 1, further comprising, prior to determining that the received query can be accelerated:
autonomously deciding to generate the optimized data structure.

11. The method of claim 10, wherein the decision to generate the optimized data structure is based on a history of queries received by the one or more server computers.

12. The method of claim 10, wherein the decision to generate the optimized data structure is based on a determination that reading the optimized data structure in lieu of reading the at least some data from the multiple data sources improves processing of an expected workload.

13. The method of claim 1, further comprising, prior to receiving the query:
receiving user input requesting acceleration of queries on one or more datasets of the multiple physical datasets; and
generating the optimized data structure in response to the received request.

14. The method of claim 1, wherein the modified query plan is only executed by a distributed query engine of the one or more computer servers.

15. A computer system comprising:
a processor; and
an autonomous memory containing instructions that, when executed by the processor, cause the computer system to:
connect to multiple data sources that contain multiple physical datasets;
cause display of a visual dataset editor;
allow multiple users to curate data by using the visual dataset editor to create multiple virtual datasets derived from the multiple physical datasets without creating any physical copies of the curated data;
autonomously generate an optimized data structure based on a physical dataset contained in the multiple data sources,
store the optimized data structure in the autonomous memory, the optimized data structure in the autonomous memory configured to be associated with a time of expiration;
refresh the optimized data structure to remove outdated data and update data stored in the optimized data structure;
detect the time of expiration has not expired;
receive a query;
generate an initial query plan based on the query, wherein the query plan includes computer instructions configured to include references to at least some of the multiple physical datasets contained in the multiple data sources;
in response to receiving the query and detecting that the expiration time has not expired, substitute at least a portion of the initial query plan to access the optimized data structure stored in the autonomous memory instead of accessing the physical dataset or a virtual dataset derived from the physical dataset to generate a modified query plan, thereby accelerating processing of the query by the computer system, and
determine that the optimized data structure satisfies the query cost-effectively.

16. The system of claim 15, wherein the multiple virtual datasets are exposed as tables in client applications.

17. The system of claim 15 further caused to:
allow the multiple users to share the multiple virtual datasets via the visual dataset editor.

18. The system of claim 15, wherein the visual dataset editor includes a control that upon being selected by a user causes the computer system to open a client application connected to a virtual dataset.

19. The system of claim 15 further caused to:
cause display of a visualization indicative of relationships between of the multiple physical datasets and the multiple virtual datasets.

20. The system of claim 15 further caused to:
allow the multiple users to control levels of access to the multiple virtual datasets for different users via the visual dataset editor.

* * * * *